US009821960B2

(12) United States Patent
Issing

(10) Patent No.: US 9,821,960 B2
(45) Date of Patent: Nov. 21, 2017

(54) STORAGE AND ORDER-PICKING SYSTEM AND METHOD FOR PROVIDING ARTICLES IN A PARTICULAR ORDER

(71) Applicant: SSI Schaefer Noell GmbH Lager- und Systemtechnik, Giebelstadt (DE)

(72) Inventor: Elmar Issing, Giebelstadt (DE)

(73) Assignee: SSI Schäfer Noell GmbH Lager- und Systemtechnik, Giebelstadt (DE)

( * ) Notice: Subject to any disclaimer, the term of this patent is extended or adjusted under 35 U.S.C. 154(b) by 0 days.

(21) Appl. No.: 15/429,406

(22) Filed: Feb. 10, 2017

(65) Prior Publication Data
US 2017/0203921 A1 Jul. 20, 2017

Related U.S. Application Data

(63) Continuation of application No. PCT/EP2015/068359, filed on Aug. 10, 2015.

(30) Foreign Application Priority Data

Aug. 11, 2014 (DE) .......................... 10 2014 111 394
Aug. 10, 2015 (WO) .................. PCT/EP2015/068359

(51) Int. Cl.
*G06F 7/00* (2006.01)
*B65G 1/04* (2006.01)
(Continued)

(52) U.S. Cl.
CPC ............. *B65G 1/0492* (2013.01); *B65G 1/06* (2013.01); *B65G 1/1373* (2013.01)

(58) Field of Classification Search
USPC ........................................................ 700/216
See application file for complete search history.

(56) References Cited

U.S. PATENT DOCUMENTS 4,773,807 A * 9/1988 Kroll .................... B65G 1/0485
  414/266
7,261,509 B2 * 8/2007 Freudelsperger .... B65G 1/1378
  414/269
(Continued)

FOREIGN PATENT DOCUMENTS

DE     10136354       6/2010
DE   102011089858    6/2013
(Continued)

OTHER PUBLICATIONS

International Preliminary Report on Patentability for corresponding Patent Application No. PCT/EP2015/068359 dated Feb. 16, 2017.
(Continued)

*Primary Examiner* — Kyle Logan
(74) *Attorney, Agent, or Firm* — Renner, Otto, Boisselle & Sklar, LLP

(57) ABSTRACT

A storage and picking system including racks having a multiplicity of rack locations; vertical conveyors adjacent laterally to longitudinal sides of corresponding racks or arranged within the corresponding racks; transfer locations arranged for material-flow-related uncoupling between the vertical conveyors and storage-and-retrieval units; storage-and-retrieval units in aisles between the racks; and a conveying level free of rack locations. The vertical conveyors are assigned respective transfer locations in the conveying-means level. A material-flow computer (MFR), which has access to a topology made up of a multiplicity of waypoints and segments, provides article-specific, sequence- or distribution-weighted transport orders to transport the articles between the rack locations and starting points/destinations. The transport orders each have a route, in the conveying-means level, which represents linked segments and along which the articles are moved between the transfer locations (Continued)

and the starting points/destinations, and each of the segments connects one waypoint to another waypoint.

14 Claims, 12 Drawing Sheets

(51) Int. Cl.
    *B65G 1/06*     (2006.01)
    *B65G 1/137*     (2006.01)

(56) References Cited

U.S. PATENT DOCUMENTS

| | | | |
|---|---|---|---|
| 8,412,400 B2 * | 4/2013 | D'Andrea | G05B 19/41895 701/23 |
| 8,892,240 B1 * | 11/2014 | Vliet | B65B 59/00 700/213 |
| 8,974,168 B2 * | 3/2015 | Yamashita | B65G 1/04 414/277 |
| 8,989,918 B2 * | 3/2015 | Sturm | B66F 9/063 701/2 |
| 9,448,560 B2 | 9/2016 | D'Andrea et al. | |
| 2010/0300048 A1 * | 12/2010 | Krizmanic | B65G 1/1378 53/452 |

FOREIGN PATENT DOCUMENTS

| | | |
|---|---|---|
| EP | 2044494 | 4/2009 |
| EP | 2287093 | 2/2011 |
| EP | 2450223 | 5/2012 |
| EP | 2543611 | 1/2013 |
| JP | S63-67503 U | 5/1988 |
| JP | H0672512 | 3/1994 |
| JP | 2003285906 | 10/2003 |
| JP | 2004123240 | 4/2004 |
| JP | 2010120758 | 6/2010 |
| JP | 2011102166 | 5/2011 |
| WO | WO 2007/134840 | 11/2007 |
| WO | WO 2007/149711 A2 | 12/2007 |

OTHER PUBLICATIONS

Günter Ullrich: "Fahrerlose Transportsysteme"; partial translation of book, 2011, pp. 80-83 and 95-97.

* cited by examiner

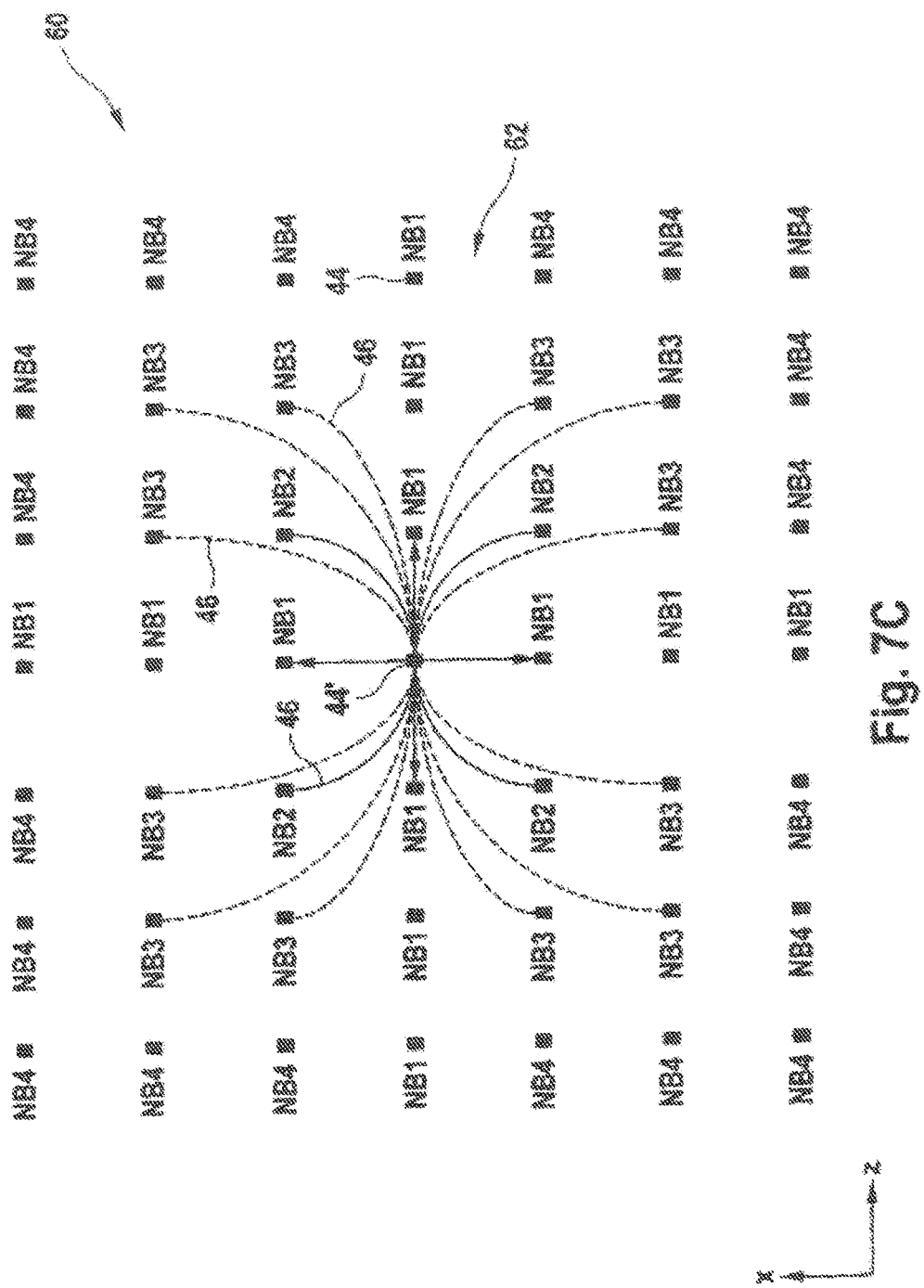

STORAGE AND ORDER-PICKING SYSTEM AND METHOD FOR PROVIDING ARTICLES IN A PARTICULAR ORDER

RELATED APPLICATIONS

This is a continuation application of the co-pending international application WO 2016/023861 A1 (PCT/EP2015/068359) filed on Aug. 10, 2015, which claims priority of the German patent application DE 10 2014 111 394.2 filed on Aug. 11, 2014. These applications are fully incorporated herein by reference.

BACKGROUND OF THE INVENTION

The present invention relates to a storage and order-picking system. For storing and retrieving articles, in an optimized manner, in and from the system in particular a correspondingly configured material-flow computer as well as preferably a driverless transport system (FTS) including autonomous driverless transport vehicles (FTF) are used. Classic pre-zone, which is marked by steady conveyors including sorters, is replaced by a conveying plane. The invention is particularly used in "case picking" scenarios.

RELATED PRIOR ART

With both "case picking" and "piece picking" storage containers are transported in an order-orientated manner from a warehouse towards a picking-work station for the purpose of article removal and delivery. The warehouse comprises racks in which the articles can be stored with or without load supports. The storage and retrieval of the articles is performed by means of storage and retrieval devices, load-handling devices (LHD) of which are typically moveable horizontally and, if necessary, vertically in rack aisles being defined between the racks. The storage and retrieval devices are supplied with the articles via vertical conveyors, or elevators, which in turn are arranged at a front face of the racks and rack aisles. A corresponding arrangement is exemplarily disclosed in the document U.S. Pat. No. 7,261,509 B. The elevators convey the articles vertically to a conveying system plane being arranged adjacent again at a front face, or front end, of the racks and rack aisles. This conveying-line plane is also designated as a "pre-zone".

Typically, the pre-zone comprises a plurality of conveying-line branches which are used as buffering lines for connecting the respective rack aisles in a conveying manner to a sorting circle which brings the retrieved articles into a desired order, i.e. the articles are delivered (see also FIG. 9A) in the desired order to one or more target locations (e.g., picking-work station). Conventional systems always comprise a sorting circle representing a bottle neck in terms of material flow.

The document US 2010/300048 A1 discloses a pre-zone having buffering lines between a centrally arranged sorting circle and elevators being arranged at a front face. Since the buffering lines and the sorting circle respectively comprise an unchangeable course of lines and since the sorting circle has a limited receiving capacity it is required that the storage and retrieval devices and the elevators, which represent two separate sequencing stages, sequence the articles in advance. This means that the storage and retrieval devices retrieve the articles in a pre-determined order (first sequencing stage) which corresponds roughly, but not exactly, to the desired order. If several storage and retrieval devices are operated on top of each other a (rack) plane, from which the elevators retrieve the articles being delivered by the storage and retrieval devices in order to transport the articles vertically towards the pre-zone, represents a further second sequencing stage. In a third sequencing stage (sorting circle) the final sequencing is performed in terms of delivery to the target location(s). In this case planning and controlling efforts are significant for bringing the articles in the desired order to the work station (target location). The planning needs to be performed in advance in three stages and already starts with the selection of one of the storage and retrieval devices. Then the storage and retrieval devices need to cover, due to the sequence, very long ways, or paths, within the rack aisles for retrieving an article preset by the (pre-) sequence and for bringing same to the elevator arranged at the front face.

Another problem is to be seen in the space available to the system. The pre-zone is arranged, as a rule, in front of the warehouse at the front face. Typically the pre-zone is relatively small (compared to the warehouse). The steady conveyors (such as roller lines, belt conveyors, strap conveyors, chain conveyors, etc.), which are used in the pre-zone, have a fixed course of lines which cannot be changed simply. After start-up of the system the course of lines, particularly within the pre-zone, is actually preset in a fixed manner and unchangeable. The conveying components of the pre-zone often are difficult to access just because of the spare space for maintenance operations. In FIG. 1 of the document DE 101 36 354 A1 it is disclosed a relatively complex course of lines of the conveying system within the pre-zone for supplying two work stations with storage containers via two separate conveying circles. As a rule, the pre-zone is crossed by an additional conveying line dedicated to order containers so that even less space is available.

A "steady conveyor" is to be understood as conveyor which transports the conveying goods (bulk material or piece goods) in a steady flow from one or more deposition locations (sources) to one or more delivery locations (targets). Examples of steady conveyors are: belt conveyors, roller conveyors, chain conveyors, and circle conveyors. Typical features of steady conveyors are: continuous/discrete-continuous conveying-good stream, central drive in continuous operation, loading and unloading in operation, always ready for receiving/delivering, and stationary devices. The continuous operation allows transport of relatively huge amounts in short time (compared to non-steady conveyors).

A front-faced transfer of the articles from and into the racks via the elevators, which are arranged at the front face, represents a bottle neck of performance. Performance is to be understood in the following as a number of storage/retrieval processes per unit of time, or a number of picks per unit of time. In the document WO 2007/134840 A, which has been filed on behalf of the applicant, it is disclosed a warehouse layout which deviates from the arrangement of the elevators at the front face. WO 2007/134840 A proposes to respectively position a plurality of elevators laterally to the longitudinal sides of the racks for increasing—compared to elevators arranged at the front face—the performance. However, this plurality of elevators is in turn coupled to conventional steady conveyors which bring the retrieved articles to (picking) work stations which are located, as a rule, far away. Due to the utilization of steady conveyors in the pre-zone WO 2007/134840 A still requires pre-sequencing by means of the storage and retrieval devices within the warehouse, or within the racks. Additionally, the steady conveyors require relatively much space and thus make, amongst other things, a spatial compaction of the warehouse layout difficult.

A similar approach is shown in EP 2 287 093 B1. There, several vertical conveyors are placed along one rack aisle, which vertical conveyors deliver to-be-transferred articles to a steady-conveyor plane. A group of adjacent vertical conveyors is assigned unchangeable to one single target location (work station) being connected via respectively one sorting circle in a conveying manner to the vertical conveyors of the group.

A different conceptual approach is described in the document EP 2 044 494 A1. There, autonomous vehicles (shuttles) are disclosed which move smallest racks within an action area from a storage region into a picking region. This means that to-be-picked articles are not retrieved from the racks and are not transported to the work stations by means of the vehicles, but that the vehicles transport the racks directly to the work stations. However, even in this case planning efforts are significant. The sequencing is complicated because entire racks need to be moved in the right order (and orientation) to the work station.

SUMMARY OF THE INVENTION

Therefore, it is an object of the present invention to provide an enhanced storage and order-picking system which can respond flexible to sequencing requirements or article-distribution requirements but still ensures an optimal performance.

According to a first aspect of the invention it is disclosed a storage and order-picking system for storing and retrieving a plurality of storage goods comprising: a statically arranged rack arrangement, which comprises a plurality of racks, wherein the racks respectively comprise a plurality of being rack locations being arranged on top of each other and next to each other, in which rack locations the storage goods are storable and retrievable, wherein the racks define at least one rack aisle between each other; a plurality of statically arranged vertical conveyors, wherein respectively several ones of the vertical conveyors are arranged either laterally adjacent to longitudinal sides of the corresponding racks or within the corresponding racks for the purpose of linking the rack aisles, and wherein the vertical conveyors transport the storage goods substantially vertically; a plurality of transfer locations which are arranged for decoupling material flow between the vertical conveyors and the storage and retrieval devices in the rack arrangement, wherein each of the vertical conveyors has assigned at least one of the transfer locations; a plurality of storage and retrieval devices which are moveable, preferably substantially only, in the rack aisles, preferably in a rail-guided manner, wherein the storage and retrieval devices store and retrieve the storage goods, preferably chaotically, and transport the same substantially horizontally along the rack aisles; a conveying plane: which is substantially free of barriers, in particular free of rack locations; which extends horizontally beneath, above, or through the rack arrangement; which is coupled in a conveying manner via the vertical conveyors, which reach vertically from the rack arrangement just into the conveying plane, to the rack arrangement, wherein each of the vertical conveyors has assigned at least one handing-over location in the conveying plane; which includes a plurality of start/target locations; and which comprises a base area including a topology of a plurality of way points and segments; and a material-flow computer having access on the topology and being configured for generating and outputting storage-good-specific transport orders, which are sequence-weighted or distribution-weighted, in order to transport the storage goods between the rack locations and the start/target locations, wherein the transport orders respectively comprise a travelling path, which represents related segments, in the conveying plane, along which travelling path the storage goods are moved in a dedicated manner between the handing-over locations and the start/target locations, wherein each of the segments connects one of the way points to another one of the way points.

According to a second aspect of the invention it is disclosed a storage and order-picking system for storing and retrieving a plurality of storage goods, wherein the storage goods arrive in a desired order at a target location during sequenced retrieval or wherein the storage goods are distributed during storage, comprising: a statically arranged rack arrangement including a plurality of racks, wherein the racks respectively comprise a plurality of rack locations being arranged on top of each other and next to each other, in which rack locations the storing goods are storable and retrievable, wherein the racks define at least one rack aisle between each other; a plurality of statically arranged vertical conveyors, wherein respectively several ones of the vertical conveyors are arranged either laterally adjacent to longitudinal sides of the corresponding racks or within the corresponding racks for the purpose of linking the rack aisles, and wherein the vertical conveyors transport the storage goods substantially vertically; a plurality of transfer locations which are arranged for decoupling material-flow between the vertical conveyors and the storage and retrieval devices in the rack arrangement, wherein each of the vertical conveyors has assigned at least one of the transfer locations; a plurality of storage and retrieval devices which travel in the rack aisles, wherein the storage and retrieval devices store and retrieve the storage goods and transport the storage goods substantially horizontally along the rack aisles; a conveying plane which: is substantially free of barriers; extends horizontally beneath, above, or through the rack arrangement; includes handing-over locations; is coupled, in terms of conveyance, via the vertical conveyors, which reach vertically from the rack arrangement into the conveying plane, to the rack arrangement, wherein each of the vertical conveyors has assigned at least one of the handing-over location; includes a plurality of start/target locations, wherein each of the vertical conveyors is coupable respectively via several different short travelling paths to each of the start/target locations; and includes a base area which base area includes a topology of a plurality of way points and segments; and a material-flow computer having access on the topology and being configured for generating and outputting storage-good-specific transport orders, which are sequence-weighted or distribution-weighted, in order to transport the storage goods between the rack locations and the start/target locations, wherein the transport orders respectively comprise a travelling path, which represents associated segments, in the conveying plane along which travelling path the storage goods are moved in a dedicated manner between the handing-over locations and the start/target locations by means of autonomous driverless transport vehicles FTF, wherein each of the segments connects one of the way points to another one of the way points The substitution the steady conveyors, which are used classically in the pre-zone, by a chessboard-like structured transport network (conveying plane) as well as by the enlargement of the pre-zone by displacement beneath, above, or through the rack arrangement allows free assignment of a very big number of sources (vertical conveyors) to sinks (work stations). Each target location can be supplied with articles by each start location because a plurality of different conveying paths can be defined, which conveying paths are then selected later. The travelling paths can be defined arbitrarily because they can be combined from an almost infinite plurality of segments. The number of possible paths, or ways, between a source and a sink is significantly increased compared to classic steady conveyors because the fixed and unchangeable course of lines thereof is omitted.

The storage and retrieval devices which are used in the rack aisles for storing and retrieving the articles can retrieve chaotically, i.e. without a sequence. The sequencing stage, which is typically associated with the storage and retrieval devices, can be omitted. Therefore, the storage and retrieval devices can retrieve in a path-optimized manner, which results in an increase of the performance (retrievals per unit of time). The material-flow computer is relieved because planning effort which is associated with the storage and retrieval devices is omitted with regard to sequencing. The same applies in an opposite direction for the storage, wherein an article distribution across the warehouse is enhanced only, instead of sequencing.

The system is easy to maintain and service friendly because the conveying plane, in comparison to the classic conveying system in the often space-critical pre-zone, can be accessed better. In addition, escape routes do not represent any problem.

The conveying plane can be monitored by means of cameras so that, for example, faulty or idle standing FTF can be localized easily. The conveying plane is monitored continuously by the fleet manager. The FTF themselves can be provided with cameras.

The material-flow connection (course of lines) between the vertical conveyors (start/target location) and the work stations (target/start location) can be changed at any time allowing a new assignment of the vertical conveyors to the work stations at any time.

The simplification of the material flow, which is achieved thereby, from the vertical conveyors to the work stations allows supplying more work stations at steady-state overall areas with articles. In addition, arbitrary regions of the warehouse can be accessed.

The overall performance of the system is increased.

Preferably, the way points are arranged along a regular grid.

In particular, the material-flow computer is further configured to define each of the segments free of barriers from one of the way points to another way point being a neighbor of second to x-th grade.

The material-flow computer can arbitrarily define, or put together, the paths, or ways, from the start/target locations to the target/start locations. Traffic jams are avoided because travelling paths do not need to be used multiple times since each article gets construed is own travelling path, wherein the quantities of sequence and article distribution need to be considered nevertheless. Sorting circles can be omitted completely.

In particular this is expressed in that each of the vertical conveyors can be coupled via several different short travelling paths to each of the start/target locations.

With another embodiment the plurality of rack locations represents a first control stage, wherein the plurality of storage and retrieval devices represents a second control stage, wherein the plurality of vertical conveyors represents a third control stage, wherein the plurality of possible travelling paths represents a fourth control stage, and wherein the plurality of start/target locations represents a fifth control stage.

Even warehouses, or rack arrangements, which are divided for structural-engineering reasons, can be connected to each other in terms of a material flow without problems. System expansions into, for example, even other buildings are possible. The control stages allow uniform distribution of the loads onto the different material-flow components.

In particular, the plurality of transfer locations represents a further control stage.

Preferably, the handing-over locations represent a still further control stage.

Further, it is advantageous if the material-flow computer is configured to adjust the control stages to each other by weighting such that retrieval performance, or storage-good distribution, is optimal.

In this manner a dynamic sequence shifting (retrieval) or shifting of the article distribution (storage) can be achieved.

Also, it is advantageous to further configure the material-flow computer such that the transport orders are planned in a path-optimized manner at least for the storage and retrieval devices.

The storage and retrieval devices are then operated at very high performance (storage/retrieval processes per unit of time), in any case at a higher performance compared to a state in which they do not need to sequence additionally.

In particular, each of the transport orders is defined by one of the following storage-good-specific parameters: selection of one of the rack locations; selection of one of the storage and retrieval devices which retrieves or stores the corresponding storage good at the selected rack location; selection of one of the vertical conveyors; selection of a start/target location; and selection of one of the travelling paths connecting the selected vertical conveyor via related segments to the selected start/target location.

Optionally, even selection of one of the transfer locations and selection of one of the handing-over locations represent parameters of the transport orders.

With another advantageous embodiment the base area encloses substantially completely the racks and the rack aisles of the rack arrangement.

The pre-zone is displaced beneath, into, or above the rack, or the rack arrangement and thereby enlarged.

In particular, the conveying plane comprises a plurality of conveying modules which implement the segments in terms of lines and which implement the way points in terms of crossings or branches.

The conveying plane can also be implemented, for example, by a chessboard-like structured roller-conveying structure, wherein at crossings, for example, liftable and lowerable strap conveyors are used which are lifted and lowered between the rollers for allowing transverse traffic.

Preferably, the topology further comprises location information on the vertical conveyors and other travelling obstacles in the base area.

It is clear that the above mentioned and hereinafter still to be explained features cannot only be used in the respectively given combination but also in other combinations or alone without departing from the scope of the present invention.

BRIEF DESCRIPTION OF THE DRAWINGS

Embodiments of the invention are illustrated in the figures and will be explained in more detail in the following description, wherein:

FIG. 7C shows a plurality of way points which are arranged along a grid;

PREFERRED EMBODIMENTS OF THE INVENTION

Figure 1:
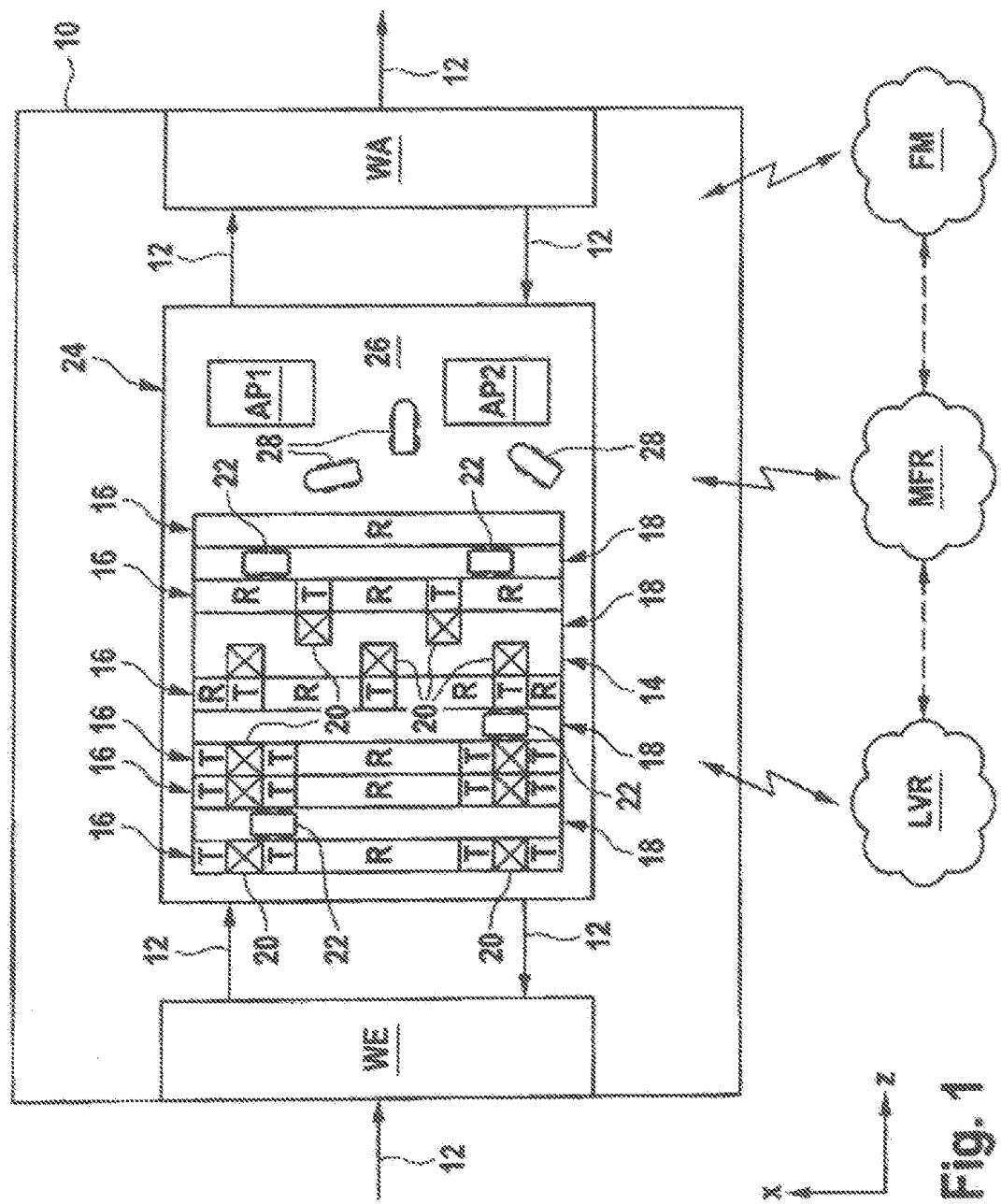
FIG. 1 shows a block diagram of a storage and order-picking system.

If vertical or horizontal orientations are mentioned in the following, it is clear that elements being associated with these orientations can be exchanged with each other by a corresponding rotation so that such orientations are not to be understood in a limiting manner.

As common practice in the field of (intra) logistics, in storage and order-picking systems (distribution systems, material-handling systems, etc.) a longitudinal direction is designated by "X", a transversal direction is designated by "Z", and a height direction is designated by "Y". The directions X, Y, and Z preferably define a Cartesian coordinate system.

A warehouse arrangement, or a rack arrangement, 14 is to be understood in the following as a plurality of racks 16 which most times are arranged parallel in terms of individual racks or double racks. Double racks are individual racks which are set up back-to-back. The racks 16 substantially extend longitudinally. Rack aisles 18 are defined transversally between the racks 16 and serve as action space of storage and retrieval devices 22 and for transfers of articles. The racks 16 terminate at (short) front sides which are respectively arranged oppositely and which in turn are orientated in a plane perpendicular to the longitudinal direction, i.e. to the (long) longitudinal sides of the racks 16 and to the rack aisles 18. The racks 16 as such comprise a plurality of (rack) storage locations, or deposition locations, R being arranged in rack planes which are arranged on top of each other. A rack row extends in the horizontal direction within a warehouse and typically comprises many storage locations, or deposition locations, R on top of each other and next to each other.

An "article" is to be understood in the following as a storage and/or picking unit within a storage and order-picking system 10. The storage unit, which is also designated a storage good, can include a storage-load support as well as the article itself. However, the storage unit can also include the article only if the storage-load support is omitted. Typically, load supports such as pallets, grid boxes, containers, recipients, cartons, trays, (hanging) bags, and the like are used as the storage-load supports. In particular, an "article" is to be understood as a piece good. The articles are (smallest) units of an article assortment which can be distinguished by an article type. Piece goods are individualized distinguishable articles which can be handled individually and inventory of which is handled piecewise or as a case. A "case" is a general term for a handable load unit which can be moved manually or by means of technical devices (such as conveying system, storage and retrieval device, load-handling device, etc.). Even a subset of a load unit such as a beverage box on a pallet, which is completely loaded with beverage boxes, is designated a case. The terms "article", "case", "storage good", and "piece good" are used equivalently in the following.

The terms "rack location", "storage location", "deposition location", "pallet location", and "buffering location" are used equivalently. These "locations" are to be understood as locations within the system 10 where the articles are stored. A "rack location" is a location where the articles are provided within a storage device (also for long times) for the purpose of picking. A "transfer location" is rack location being arranged adjacent to a vertical conveyor. The transfer location serves for temporarily buffering one or more articles and is connected, in terms of material flow, to the corresponding vertical conveyor for exchanging the article(s) with the vertical conveyor. The transfer location serves for de-coupling the vertical conveyors from the storage and retrieval devices. The vertical conveyors do not need to wait for the storage and retrieval devices, and vice versa, in order to transfer articles.

With the invention different types of conveyors can be used (such as roller conveyors, belt conveyors, chain conveyors, overhead conveyors, strap conveyors, etc.). The terms "conveyor", "conveyor line", and "conveying system" are used equivalently hereinafter. A conveying system includes substantially each technical and organizational device (such as drives, sensors, switches, controlling elements, etc.) for moving or transporting conveying goods (i.e. articles) and for directing material streams.

Further, the present invention is operated substantially in accordance with the "goods-to-man" principle. With the "goods-to-man" principle the to-be-picked articles are transported to an operator so that the operator, which is also designated a "picker" hereinafter, only needs to walk a little, or does not need to walk at all, for the sake of better ergonomics in order to conduct a picking process (order-orientated grabbing and delivering of articles). The to-be-picked articles are transported by means of the load supports within the system 10, particularly from and to picking stations (i.e. picking-work stations) and vertical conveyors 20.

A (picking) "order" consists of one or more order positions which are also called order lines. One order line indicates a respective quantity (number of pieces) of a type of article which has been ordered by a customer.

Further, in the field of picking it is distinguished, due to the selected strategy, between order-related picking and article-related picking, wherein the collecting of the articles can happen either serially, i.e. one after the other, or in parallel, i.e. simultaneously. With the order-related picking one order is processed as a whole, i.e. each of the articles of the order are collected serially. The manner in which it is picked can depend on many factors. One factor, which certainly plays a role, is the average order structure. It makes a difference whether different articles are to be picked at small number of pieces, or whether again and again the same articles are to be picked at high number of pieces. Thus, for example, the so-called access frequency of the to-be-picked articles can be relevant.

A "batch" is a combination of several orders to form one processing quantity. Thus, a "batch" is a combination of several orders to form an ordered, or sequenced, quantity or list of orders. During batch operation orders are at first collected and sorted in order to be processed sequentially in one episode, i.e. in one "batch". The present invention is particularly used in the field of retail via the Internet (B2B, B2C, etc.).

Coordinating the processing of orders is done by an order-transaction system which is most times integrated into a picking control which can include, for example, an inventory control system as well. The picking control can have integrated further a (storage) location administration as well as an information display. The picking control is typically realized by a data-processing system which is preferably operated for delay-free data transmission and data processing in an online mode. The picking control can be implemented by one or more controlling units which will be described in more detail below.

Typically, the orders are data sets. An order can comprise a header, a priority field, and/or an article field. The header can comprise, amongst other things, information being related to the customer who has put an order, (customer) address, or (customer) identification number as well as an order number. The priority field includes information on whether a normal order or an urgent order is present. An urgent order is an order having high (processing) priority, which is typically handled prior to normal orders. The article field comprises the order lines. Each order line comprises at least information on a number of pieces of an ordered article and on an article type.

FIG. 1 shows a block diagram of a storage and order-picking system 10 which can be used, for example, as a distribution system of a retailer, or an online retailer. The storage and order-picking system 10 hereinafter is also briefly designated as the "system 10".

The system 10 comprises a goods receipt WE as well as a goods issue WA. Material flow 12 inside and outside the system 10 is indicated by arrows. The material flow 12 is performed within the system 10 preferably by using storage and retrieval devices 22, vertical conveyors 20, and a driverless transport system ("fahrerloses Transportsystem", FTS). If necessary, a conventional conveying system is used as well.

Between the goods receipt WE and the goods issue WA of FIG. 1 a rack arrangement 14 including a number of racks 16 is provided, which racks define (rack) aisles 18 between each other. The racks 16 extend substantially in the longitudinal direction X and are distanced to each other in the transversal direction Z. The material flow 12 in the height direction Y (perpendicular to drawing sheet) is conducted within the rack arrangement 14 substantially by means of vertical conveyors 20. The vertical conveyors 20 are also called elevators. In this context preferably steady conveyors are used for conducting the material flow 12 exclusively in the vertical direction Y. The vertical conveyors 20 are stationary, i.e. they do not move relative to the racks 16. The vertical conveyors 20 can be arranged outside or inside the racks 16. With an arrangement within the racks 16 one speaks of rack-integrated vertical conveyors 20. A corresponding rack arrangement 14 including rack-integrated vertical conveyors 20 is exemplarily described in WO 2012/113681, which is incorporated herewith by reference. Such rack-integrated vertical conveyors 20 are shown in FIG. 1, in particular in the first three racks 16 on the left-hand side. Beside the rack-integrated vertical conveyors 20 further vertical conveyor 20 can be provided within the rack aisles 18 additionally and/or alternatively. A corresponding arrangement is exemplarily described in WO 2007/134840 A1, which is incorporated herewith by reference. In FIG. 1 the second rack aisle 18 on the right-hand side is selected relatively broad. This rack aisle 18 can be formed smaller in the direction Z so that each of the vertical conveyors 20 is arranged adjacent to both racks 16 at the left-hand side and the right-hand side. The interstices in X can be filled by rack locations R.

In the rack arrangement 14 always a plurality of vertical conveyors 20 is assigned to, or associated with, the racks 16, which vertical conveyors 20 are arranged either within the racks 16 or in the rack aisles 18 in a distributed manner along the longitudinal direction X. However, the assignment (in terms of material flow) can also be made across one rack aisle 18, as exemplarily shown for the rack 16 in FIG. 1 which is arranged at the outermost right-hand side. In and at rack 16 being arranged at the outermost right-hand side of FIG. 1 no vertical conveyor 20 is arranged at all. The connection, in terms of material flow, happens via the storage and retrieval device(s) 22 to the rack 16 which is arranged adjacent at the left-hand side.

The storage and retrieval devices 22 (hereinafter also designated "SRD") retrieve storage goods, or articles, which are not designated and are not shown in more detail, from the rack locations R in the racks 16, or store the same into the rack locations R in the racks 16. For this purpose the SRD 22 are provided with load-handling devices (hereinafter also designated "LHD"), which are not designated and are not shown in more detail and by which the storage goods, or articles, are moved substantially in the direction Z for the purpose of storing and retrieving. The SRD 22 substantially move within the rack aisles 18 and serve for the material flow 12 in the direction X within the rack arrangement 14. If the SRD 22 are provided with masts, which are not shown and designated here in more detail, the SRD 22 cover the material flow 12 even in the height direction Y. The racks 16 can be vertically structured in a modular manner, wherein at least one SRD 22 is provided for each module. As a rule, the SRD 22 travel in a rail-guided manner. Corresponding rails are not depicted.

Without mast and without lifting functionality the SRD 22 merely operate one single rack plane. In this case one speaks of one-plane storage and retrieval devices which are also called shuttles (without lifting functionality). Any type of SRD can be used.

In general, the SRD 22 move preferably inside the rack arrangement 14 only. The material flow 12 outside the rack arrangement 14 such as from and to (picking) work stations AP is substantially performed by autonomous driverless transport vehicles 28 (hereinafter also designated "FTF") which are also called "shuttles" in the field of intralogistics. These FTF, or shuttles, 28 move outside the rack arrangement 14 in the conveying plane 24, which includes a travelling area, or action area 26.

In FIG. 1 exemplarily two work stations AP1 and AP2 are shown. The work stations AP are arranged preferably along the longitudinal side(s) of the rack arrangement 14 in the conveying plane 24 so that the material flow 12 towards the work stations is substantially performed in the transversal direction Z by the FTF 28. More or less work stations AP can be provided. The work stations AP are arranged in the area 26 and are coupled, in terms of material flow, to the rack arrangement 14 via the FTF 28. The conveying plane 24 can be provided, preferably in terms of one single flat, horizontal plane beneath, above, or within the rack arrangement 14. The conveying plane 24 is connected, in terms of material flow, via the vertical conveyors 20 to the racks 16.

If picking is performed at one of the work stations AP1 or AP2 the SRD 22 retrieve the corresponding articles in an order-orientated manner from the rack locations R, transport the retrieved articles substantially horizontally to transfer locations T being arranged oppositely to the vertical conveyors 20 within the racks 16 instead of rack locations R and being configured for exchanging the articles with the vertical conveyors 20. The vertical conveyors 20 retrieve the articles buffered, preferably double-deep, from the transfer locations T, and transport same in the vertical direction Y into the conveying plane 24. In the conveying plane 24 the articles, which are provided by the vertical conveyors 20, are delivered to the FTF 28 which in turn move the delivered articles to the corresponding target locations, namely, for example, to the work stations AP1 and/or AP2. Corresponding travelling paths, or ways, (routes in terms of navigation) are determined by a fleet manager FM (controlling software including corresponding hardware) in an order-orientated and sequence-orientated manner and are communicated individually to the FTF 28. If the conveying plane 24 is implemented by conventional conveying modules (e.g., roller conveyors) the "travelling path" corresponds to a conveying line having a selected course. The fleet manager FM can be part of a superordinated material-flow computer MFR (hardware and software), which in turn can be part of a warehouse-management computer LVR (hardware and software). In FIG. 1 these controlling components FM, MFR, and LVR are shown as separate components which are independent from each other. These components can be implemented in a centralized or decentralized distributed manner.

Figure 2A:
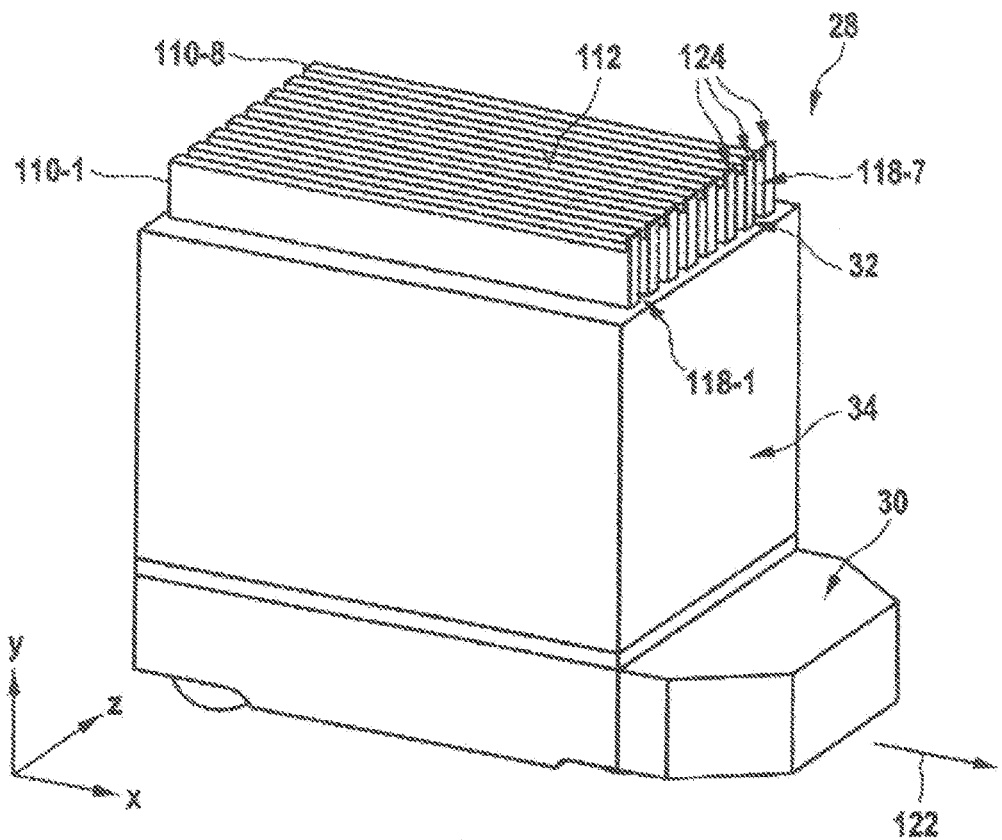
FIG. 2A shows an FTF including a top.
Figure 2B:
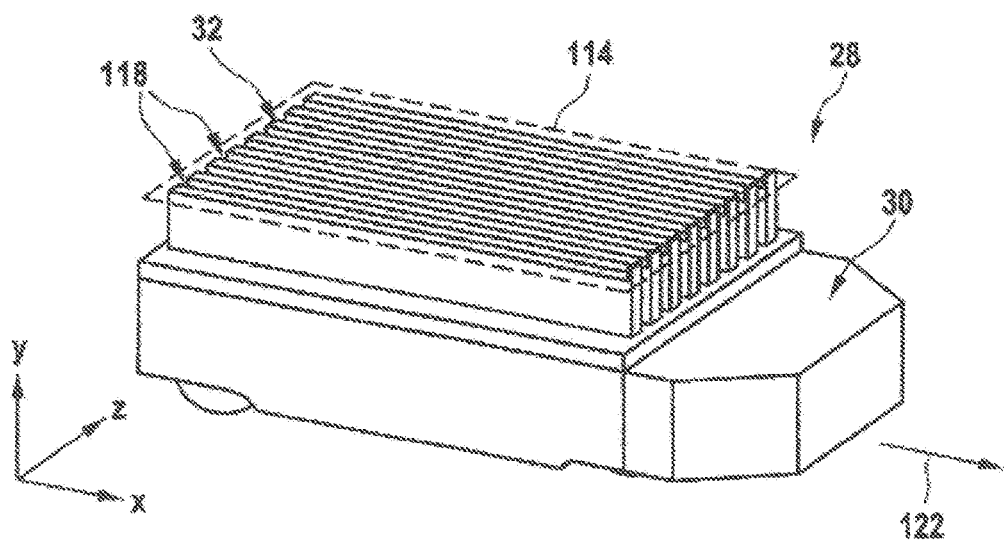
FIG. 2b shows an FTF without a top.

The FIGS. 2A and 2B show perspective views of a first embodiment of one FTF 28. FIG. 2A shows one FTF 28 being adapted for operating in hip height of a picker by providing an (elevation) top 34 between the actual vehicle 30 and a, e.g., lamella-shaped (article) receiving device 32 so that a top side of the receiving device 32 is located at a height of about 700 mm. In FIG. 2B the identical vehicle 30 is shown together with an article receiving device 32, but without a top 34.

In general, the FTF 28 are automatically guided vehicles which solve transport tasks fast, cheap, and scalable in the system 10. Preferably, the FTF 28 move along a pre-defined transport network which is formed, for example, by black lines which are adhered, or painted, onto a bottom of the area 26 (cf. also FIG. 4). For example, several RFID markers can be provided along this transport network for implementing way points 44 which are exemplarily shown in FIG. 5. A line between two adjacent way points 44 is designated hereinafter as a segment 46. It is clear that the segments 46 can also be realized in terms of virtual connecting lines, for example, if an internal GPS system or laser-navigation system is used. The same applies for the way points 44. The geometrical dimension of the area 26, the way points 44, and the segments 46 define a topology of the conveying plane 24. This topology 60, which will be described with reference to FIG. 7 in more detail, is to be understood as a "map" of the conveying plane 24, if necessary including location descriptions of the vertical conveyors 20, rack posts 46, and other (travelling) obstacles. The positions of the vertical conveyors 20, the rack posts 46, and start/target locations, contour of the segments 46 as well as the dimensions of the area 26 are known. Base area of the rack arrangement 14 is known.

The FTF 28 can buffer articles and can transport articles from and to pre-determined stations (such as the work stations AP) or retrieve same from there. Loading and unloading of the FTF 28 preferably is performed passively. For example, this means that the FTF 28 do not comprise sensors for identifying articles or for actively initiating loading and unloading processes. Passive loading and unloading, for example, by utilization of ramps is described in parallel patent application with the title "Lager-und Kommissioniersystem und Verfahren zum sequenzierten Bereitsstellen von Artikeln" which has been filed by the applicant on the same day as the present application and which is referred hereby.

Exemplary FTF 28 as well as components thereof and a controlling method are described in the documents DE 10 2012 023 999 A1, DE 20 2013 010 696 U1, and DE 10 2012 006 738 A1, which are referred to herewith.

A group of FTF 28, which belong together, hereinafter is also designated as a fleet in the common transport network. Fleet control (generating, distributing, and controlling FTF-travelling orders) is performed by the fleet manager FM. The fleet control can be executed, for example, as a separate Java application being connected to the FTF 28 through TCP (WiFi) and being connected to the material-flow computer MFR through another, preferably proprietary, communication protocol (LAN). This will be explained in more detail later.

Each of the FTF 28 can comprise one or more of the following mentioned components: a camera for following the black lines of the transport network; a distance sensor for detecting obstacles or other FTF 28 in the environment; a WiFi module for communicating with the fleet manager FM; an exchangeable (power) accumulator; a microcomputer, or microcontroller, for local vehicle controlling; a storage module for recording travelling orders and, for example, referring to the topology; and/or an RFID reading device for detecting the way points 44. The way points 44 can also be realized as QR codes. The power supply can be performed alternatively by means of PowerCaps which can be exchanged at exchanging stations, wherein even inductive charging stations can be used additionally.

Each of the FTF 28 is configured to follow the black lines and to maintain a distance, which is required at minimum, to other FTF 28, in particular to the ones driving ahead. During operation the FTF 28 respectively receive a list of segments 46 from the fleet manager FM which are to be passed subsequently and which define one or more FTF-specific travelling orders, or travelling paths. For each of the FTF 28 an individual travelling path, or a route, is calculated by the fleet manager FM. Each of the FTF 28 knows the topology of the transport network, for example, for travelling from one way point 44 to an adjacent way point 44 in accordance with specifically selected segments 46, or for calculating travelling time, or for stopping at predetermined positions. For this purpose the topology of the transport network is transmitted by the fleet manager FM to the FTF 28, preferably during start of system.

Figure 3:
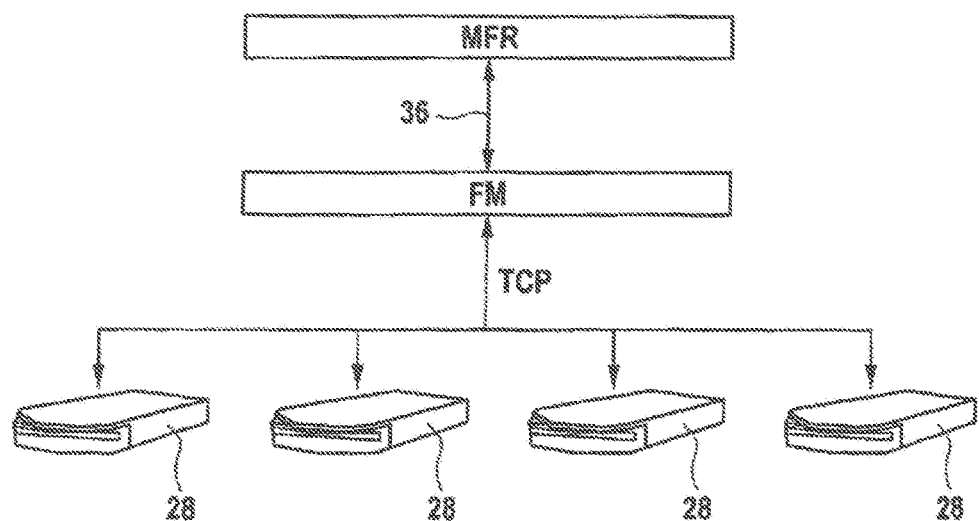
FIG. 3 shows architecture of a material-flow computer.

FIG. 3 generally shows architecture of the FTF 28 and control thereof. The material-flow computer MFR is a conventional controlling system for organizing transports in a warehouse upon utilization of different hardware systems. The material-flow computer MFR communicates via a (preferably proprietary) communication protocol 36 with the fleet manager FM. Each of the FTF 28 is assigned to a fleet manager FM, wherein each transport network is controlled preferably by its own fleet manager FM. It is clear that several fleet managers FM can be operated in parallel in the system 10. However, in this case there are also several fleets of FTF 28.

In general, the fleet manager FM represents a controlling module for each of the FTF 28 in the transport network. Also, the FM is responsible for executing and confirming transport orders, or FTF-specific travelling orders, in the transport network. The transport orders are received by the FM from the MFR. After receipt of the transport orders the FM selects appropriate FTF 28, calculates travelling paths, or routes, and transmits the corresponding lists of the required segments 46 as FTF-travelling orders to the selected FTF 28. At the manufacturers end the FTF 28 are not provided with information referring to a project-specific warehouse layout (rack arrangement 14). The required information with regard to the topology of the transport network is transmitted by the FM to each of the FTF 28, for example, during a configuration phase. FTF-travelling orders and FTF configurations are transmitted, for example, via the TCP connection.

Integration of one of the FTF 28 into the fleet control represents a separate process. For this purpose each relevant FTF parameter is defined. Corresponding files are read automatically when the FM is started. Further, project-specific network parameters are transmitted to the FTF 28. This file includes a list of each FTF 28 used and defines each parameter required for each of the FTF 28. The subsequent data can be included within the corresponding files: a unique serial number of the respective FTF 28 which is provided by the manufacturer; a fleet number; a number of the respective FTF 28 within the fleet; a home point such as an (RFID) code of one of the way points 44; a charging point for charging a battery of the FTF 28; the IP network address of the FM; a charging state; a failure state; a count of a kilometer meter or an operating-hour meter; or other parameters which are required for communication within the network and navigation within the transport network.

The transport network includes the way points 44 as well as the segments 46 which connect two way points 44, preferably unidirectionally, to each other. Each of the way points 44 has assigned its dedicated ID code. Each of the segments 46 physically corresponds to one of the black lines, which can be formed straight or curved, on the bottom of the area 26 (cf. FIGS. 4 and 5). The topology of the transport network, i.e. the arrangement and the locations of the way points 44 and the segments 46 therebetween, are known to the FM and the FTF 28. However, both components require different data information. For example, the FM merely requires a logical topology of the transport network, whereas the FTF 28 should know an accurate length of each of the segments in order to be able, for example, to stop correctly at one target-way point 44 by calculating the travelling time and distance covered for braking in advance.

Hereinafter an interface between the FM and the FTF 28, in particular the communication therebetween, is described.

After start, or re-start, each of the FTF 28 activates path and distance controlling. If a path (black line) is not detectable the FTF 28 stops without moving. Otherwise is follows the line until a first way point 44 (e.g., RFID marker) is reached. If further FTF 28, or other obstacles, are detected along the path the affected FTF 28 needs to wait. After that the FTF transmits a configuration inquiry to the FM which includes a serial number of the FTF 28 and the RFID code of the current way point 44. This inquiry is repeated (periodically) until the FM transmits an appropriate configuration to the FTF 28 which has put the inquiry. The configuration answer of the FM includes the topology of the entire transport network as well as other project-specific parameters such as an FTF-ID and a fleet ID. The FTF 28 saves each information and is then ready for FTF-travelling orders from the FM.

For moving one of the FTF 28 through the transport network the FM transmits an FTF-travelling order to the FTF 28. The FTF-travelling order includes an order ID, which comes originally from the MFR, as well as a list of the segments 46. Further, optional parameters can be included for determining, for example, a maximum velocity and acceleration of the FTF 28. The segments 46 are attached to a current internal route of the affected FTF 28, which route can be empty. This means that the FM expands the internal route of the FTF 28. As long as a current internal route of the FTF 28 is not empty, the FTF 28 continues its travel. Each time when a way point 44 is passed, i.e. a corresponding RFID marker is detected, the FTF 28 removes the first segment of the internal route and transmits an FTF-status report to the FM including the remaining route and the corresponding RFID code of the last way point 44. If the FTF 28 reaches the last segment 46 of the internal route it decreases automatically its velocity and stops accurately at the corresponding way point 44. The resulting FTF-status report then includes an empty remaining route. Typically, the FM always transmits a new FTF-travelling order in cases when the internal remaining route only includes three segments 46 at maximum which need to be travelled to.

Hereinafter an interface between the FM and the MFR is described. It is also described how the communication between the FM and the MFR runs. Typically, this communication happens via a (proprietary) communication protocol. It is to be noted that an FM can also communicate with a plurality of MFR if required.

Typically, the MFR has no knowledge of the number, type, or specific characteristics of the different FTF 28 in the fleet. The MFR communicates only with the FM for directing, or navigating, one of the FTF 28 to the desired way point 44. For this purpose the MFR needs to know the RFID code of each relevant way point 44. Typically, each of the way points 44 is associated with a loading station or unloading station dedicated to the FTF 28, which will be explained in more detail below.

If the FM receives a transport order from the MFR, the FM selects automatically an appropriate FTF 28. If the FTF 28 arrives at the target-way point 44 the FM transmits a corresponding notification to the transport MFR that the transport order is completed.

In particular, each of the transport orders defines an order ID. The order ID is used for tracking. The order ID is transmitted to the FTF 28. However, the order ID can also be used for continuing a previous movement by means of the identical FTF 28 for preventing, for example, an automatic selection of the FTF 28 by the FM.

If the FM receives a new transport order the FM first checks whether there is an FTF 28 being associated with this order ID. If yes, the FM preferably uses this pre-selected FTF 28 for executing the order. In order to be able to execute this order the FTF 28 have knowledge of the order IDs.

Exemplary transport orders are: loading order; unloading order; and/or travelling order.

Also, the FM is responsible for avoiding collisions at intersection points (way points 44).

Figure 4:
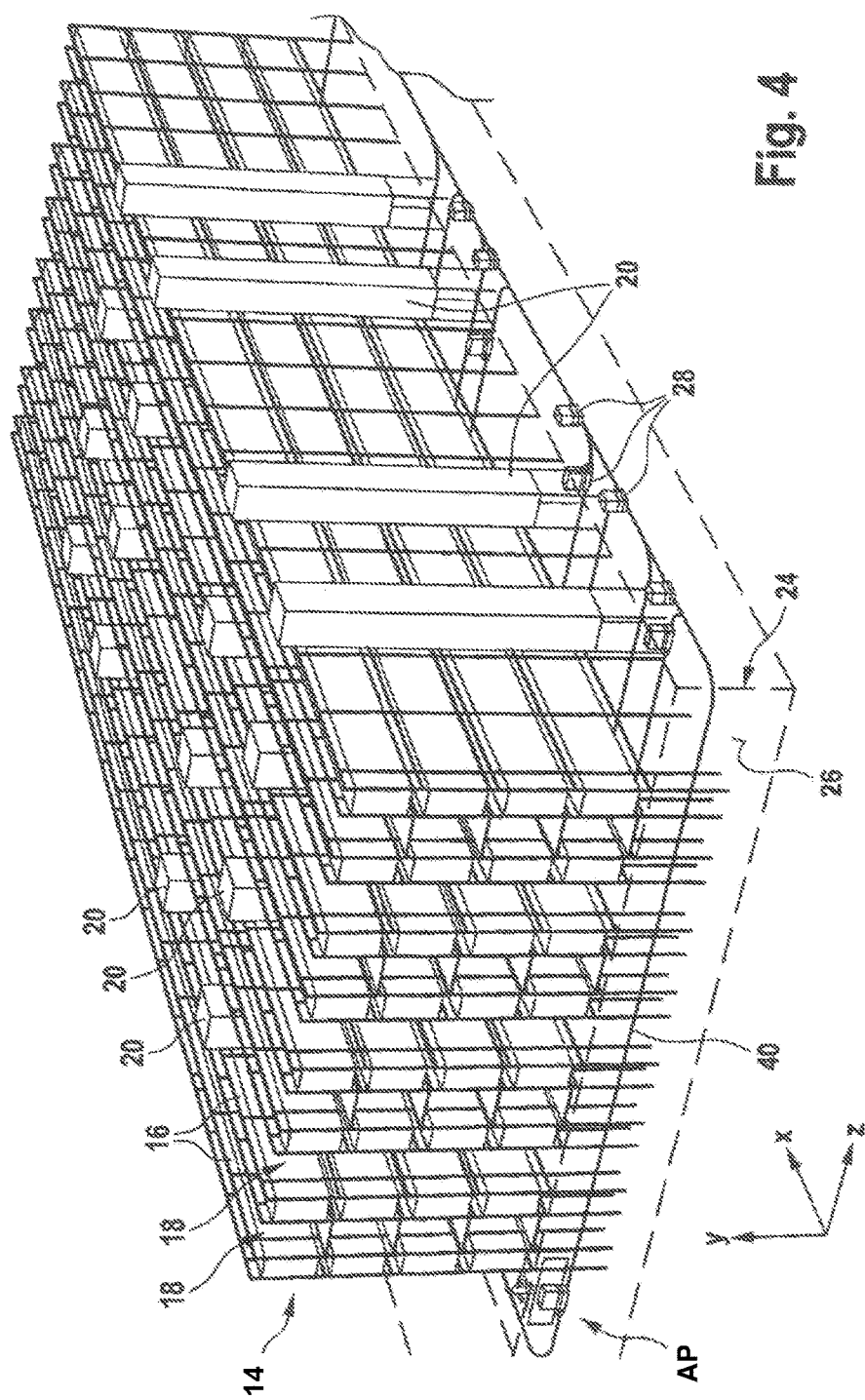
FIG. 4 shows a perspective view of a conveying plane beneath a rack arrangement.

FIG. 4 shows a perspective view of an embodiment of the system 10 where the conveying plane 24 is arranged beneath the racks 16 of the rack arrangement 14 and extends across a base area of the rack arrangement 14. The vertical conveyors 20 are arranged laterally to the racks 16 in rack aisles 18. Each of the racks 16 is coupled in terms of material flow to several ones of the vertical conveyors 20. In FIG. 4 respectively four rack modules, which are not designated in more detail, are arranged on top of each other. Each of the rack modules is operated by at least one (not shown) SRD 22 within the corresponding rack aisles 18. In the rack aisles 18, where the vertical conveyors 20 are arranged, no SRD 22 travel. Vertically-orientated rack posts (posts) of the racks 16 reach into the (three-dimensional) conveying plane 24 and represent, in this sense, obstacles for the FTF 28, which can travel on the travelling area 26 along travelling paths 40 (black lines). It is clear that the FTF 28 can also be guided differently in an automated manner such as by means of a local GPS system, which does not require the black lines, by means of inductive loops, or by means of a slide-member guidance in grooves provided in the bottom of the area 26 and defining the travelling paths 40, or the segments 46.

Further, in the conveying plane 24 in FIG. 4 a work station AP is shown which is linked, in terms of material flow, via the FTF 28 to the racks 16. The FTF 28 can move freely below the racks 16 along the travelling paths 40. The conveying plane 24 is free of barriers, particularly free of rack locations R, if the rack posts and the frames of the vertical conveyor 20 are not considered. The travelling paths 40 are selected such that the FTF 28 cannot collide with the rack posts or the (machine) frames of the vertical conveyors 20. The term "substantially free of barriers" is to be understood in the following such that the base area 26, at least in the region of the rack arrangement 14, does not comprise obstacles which limit a configuration of possible travelling paths 40. It is clear that at least the vertical conveyors 20 represent obstacles in the above-mentioned sense. However, they are not to be considered, in particular as they represent, in terms of sources and sinks of the material flow, start points and target points of the travelling paths 40. Further, in some cases it is possible that parts of the racks 16 reach into the conveying plane 24 such as the rack posts 48 or individual rack locations R. The existence of individual, or some few, rack locations R in the plane 24 can also be considered as free of barriers as long as the number of possibilities for defining the travelling paths 40 is not influenced significantly, as it would be the case, for example, if even the rack rows would reach into the plane 24 which would then need to be "avoided" by the travelling paths 40. Outside the region in which the base area 26 and the rack arrangement 14 are not covered (in the projection) obstacles may be present in the plane 24 occasionally such as the work stations AP which in turn represent start points and target points of the travelling paths 40.

Figure 5:
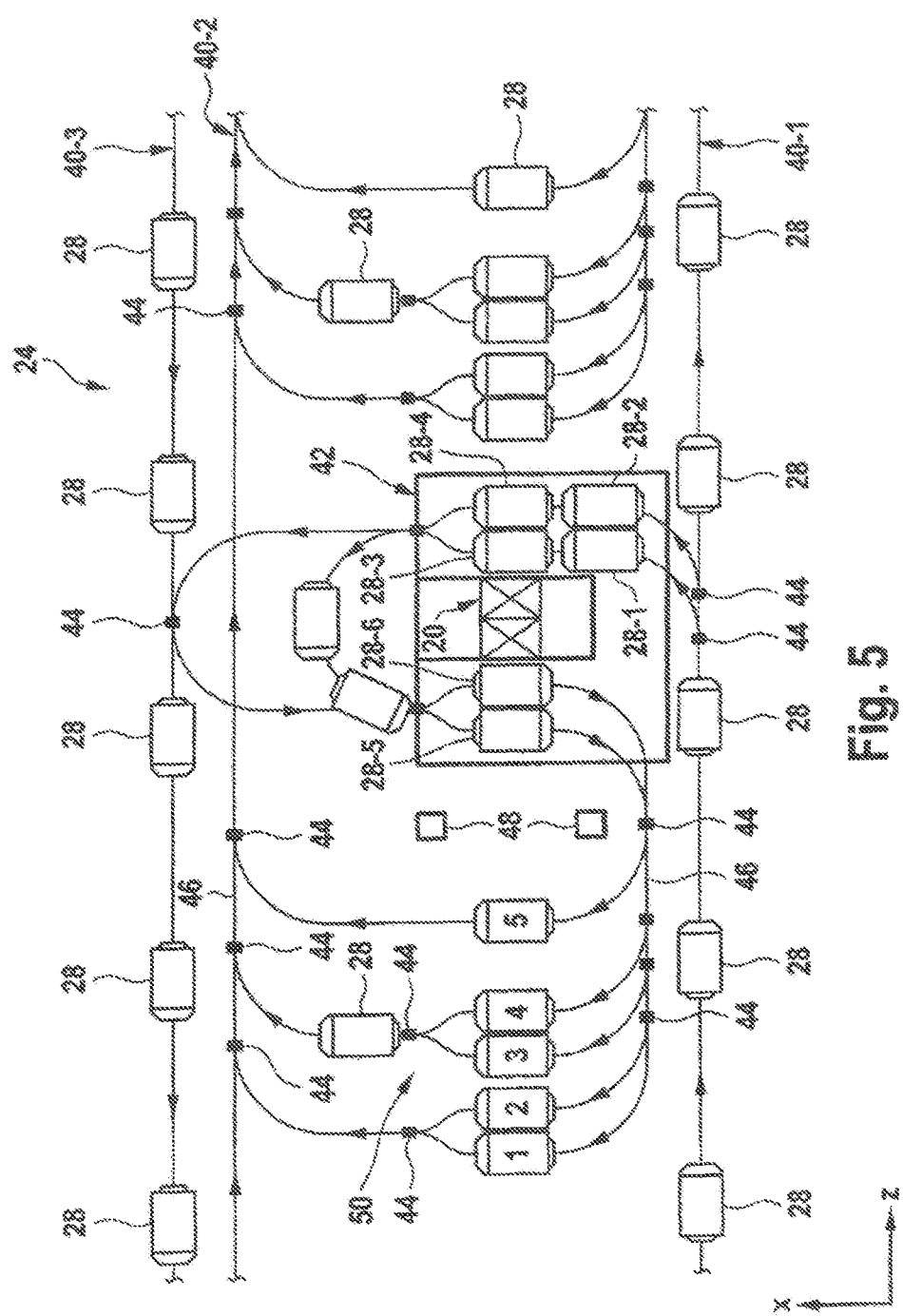
FIG. 5 shows a top view of a portion of a conveying plane.

FIG. 5 shows a top view of a portion of a conveying plane 24. An elevator arrangement 42 is arranged centrally in FIG. 5 and comprises a vertical conveyor 20 having two locations being arranged directly next to each other in Z. In this way double-deep handling is possible. Further, three travelling paths 40-1 to 40-3 are shown extending substantially horizontally in FIG. 5 along the longitudinal direction X and being respectively composed of a plurality of segments 46. Transport and travelling directions of the FTF 28 are indicated by little black triangles. In FIG. 5, a first travelling path 40-1 runs below, from the left to the right, for guiding the FTF 28 from the goods receipt WE (cf. FIG. 1) for the purpose of storing articles towards the vertical conveyors 20. A second parallely displaced travelling path 40-2 is shown above which directs the FTF 28 from the left to the right towards the work stations AP for the purpose of, for example, picking. On top of that and in parallel thereto another travelling path 40-3 is shown where the FTF 28 move from the right to the left for getting from the work stations AP to the goods issue WA. Further, the way points 44 are shown exemplarily in terms of little black squares (QR code, RFID code, bar code, etc.). Rack posts 48 are indicated by bigger black squares. The travelling paths 40 are arranged such that the FTF 28 do not collide with the rack posts 48.

In the following the elevator arrangement 42 of FIG. 5 will be considered in more detail. The two locations of the vertical conveyor are arranged directly next to each other in the direction Z. The LHD of the vertical conveyor, which LHD is not shown and designated in more detail, is configured to actively exchange articles with the FTF 28. For this purpose the vertical conveyor 20 can comprise, for example, prongs which can be extended in Z and which mesh, for example, with the receiving devices 34 (cf. FIG. 2), or lateral gripping devices for lifting or depositing the articles in a double-deep manner. The LHD of the vertical conveyor 20 can also be configured for single-deep or multiple-deep handling of the articles. The LHD of the vertical conveyor 20 can be provided further with steady conveyors for moving articles between itself and the FTF 28.

The elevator arrangement 42 comprises a spatial region in which articles are exchanged between the FTF 28 and the vertical conveyor 20. At the right-hand side adjacent to the vertical conveyor 20 two segments 46 extend which are arranged in parallel within the direct region of the vertical conveyor 20 and which substantially extend in the transversal direction Z. Also, at the left-hand side adjacent to the vertical conveyor 20, two segments 46 extend which in turn extend parallel in the transversal direction Z within the direct region of the vertical conveyors 20-1 and 20-2. In FIG. 5 four FTF 28-1 to 28-4 are shown at the right-hand side adjacent to the vertical conveyor 20, which FTF transport the articles towards the vertical conveyor 20 for the purpose of storing. The FTF 28-5 and 28-6 serve for retrieving articles from the rack arrangement 14 arranged on top thereof, which articles are moved to the level of the conveying plane 24 by means of the vertical conveyors 20. The FTF 28-5 and 28-6 travel via the second travelling path 40-2 to a work station AP being pre-determined by a (picking) order, which work station corresponds in this case to the target location. On its way to this target location the FTF 28-5 and 28-6 can pass a sequencing harp 50.

In FIG. 5 the sequencing harp 50 is provided at the left-hand side of the elevator arrangement 42 and exemplarily includes five travelling paths 40 extending initially in parallel to each other for bringing articles, which have been retrieved chaotically with regard to a sequence, into a defined order which order is preset, for example, by a picking order. In the example of FIG. 5 the articles are to be sorted ascendingly from the left to the right in the order "1-5". Independent of an order in which the articles are brought by the vertical conveyors 20-1 to 20-2 into the conveying plane 24, the articles can be brought into the preset order by means of the sequencing harp 50. The corresponding FTF 28 are called-off, as soon as they have arrived in the defined order within the sequencing harp 50, via the travelling path 40-2 towards the work station AP. When having arrived at the work station AP, which is not shown in FIG. 5, the articles can be retrieved in the preset order. In this case, the FTF 28 preferably are empty again and can transport either completely picked orders via the third travelling path 40-3 to the goods issue WA, or can be directed back to the elevator arrangements 42 from there for picking up further articles from the vertical conveyors 20. The empty FTF 28 can also travel to the WE for transporting to-be-stored articles to the vertical conveyors 20.

Similar applies for the FTF 28 which have provided articles for storage. As soon as the vertical conveyors 20 have taken over the articles the correspondingly emptied FTF 28 can either accept travelling orders for bringing retrieved articles from the rack arrangement 14 to the work stations AP or for travelling to the goods issue WA, which in turn is connected to the goods receipt, in order to be re-loaded there for the purpose of storage.

The sequencing, i.e. the arrangement of the articles in accordance with a desired order, is performed finally in the conveying plane 24 by calculating, coordinating, and outputting the FTF-travelling orders by means of the fleet manager FM. Sequence formation in the region of the rack arrangement 14, which typically is established by the SRD 22 during retrieval of the articles from the rack locations R and/or during storing of the retrieved articles into the transfer locations T, is not required. The SRD 22 (cf. FIG. 1) pick up the articles, which belong to one order, in a path-optimized manner. Path-optimized means that the articles are retrieved by the SRD 22 without considering any sequence. The retrieved articles can be provided to the vertical conveyors 20 in a non-sequenced manner, i.e. not yet in the desired ascending or descending (absolute) order, at the transfer locations T (buffer locations in the rack 16), wherein a pre-sequencing happens here, in particular if the articles are handled multiple-deep. The absolute order, in which the articles belonging to one single picking order need to be provided, for example, in accordance with a packing pattern on the target-load support, at the work station AP is irrelevant at this point. The final sequencing happens exclusively in the conveying plane 24. The selection of the vertical conveyor 20 merely represents an optional pre-sequencing, which, however, preferably does not happen, and does not need to happen either. The selection by the SRD 22 of the to-be-retrieved articles within the rack 16 preferably is performed exclusively in a path-optimized manner, i.e. the paths of the SRD 22 are selected as short as possible, resulting in a chaotic retrieval from the rack locations R. Only the selection of the transfer locations T, to which the retrieved articles are delivered by the SRD 22, can be considered in terms of pre-sequencing.

The big article streams, for the purpose of storing and retrieving, can be handled in the conveying plane 24 because many of the FTF 28 can travel freely within the conveying plane 24 along preset travelling paths 40. There is sufficient space in the conveying plane 24, even for sequencing tasks. A conventional conveying system does not offer the buffering possibilities required for the sequencing, particularly not for de-coupling the machines (vertical conveyors 20, SRD 22, and conveying system between each other).

Figure 6:
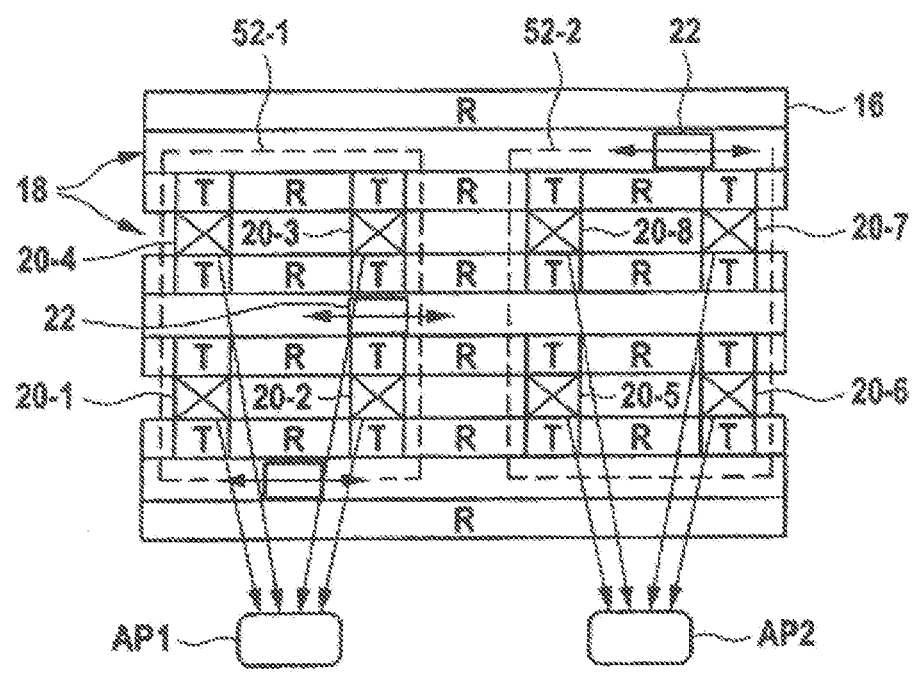
FIG. 6 shows a block diagram in top view for illustrating an assignment of vertical conveyors to work stations.

FIG. 6 serves for the illustration of an assignment of vertical conveyors 20 to work stations AP. Three rack blocks, which are not designated in more detail, and two work stations AP1 and AP2 are shown. Each of the rack blocks comprises two racks 16 defining one rack aisle 18 therebetween in which SRD 22 can travel for storing and retrieving articles in and from the rack locations R. The vertical conveyors 20 are arranged adjacent to the rack 16 between the rack blocks. In total eight vertical conveyors 20-1 to 20-8 are shown which are divided into two elevator groups 52-1 and 52-2. The vertical conveyors 20-1 to 20-4 belong to the first elevator group 52-1. The vertical conveyors 20-5 to 20-8 belong to the second elevator group 52-2. The first elevator group 52-1 is assigned to the first work station AP1. The second elevator group 52-2 is assigned to the second work station AP2. This assignment is indicated by arrows in FIG. 6. Each of the elevators, or vertical conveyors, 20-1 to 20-8 serves for the supply of the work station AP assigned thereto. The transport of the articles is performed via the FTF 28 which are not shown in the FIG. 6. Each of the elevator groups 52-1 and 52-2 can have assigned a dedicated fleet of FTF 28. Independent of an order, by which the vertical conveyors 20 supply the articles in the conveying plane 24 to the corresponding elevator groups 52-1 or 52-2, the FTF 28 can transport the supplied articles in the desired order, i.e. in a sequenced manner, to the respective work station AP.

A number of the FTF 28, which form a fleet, can vary at any time. For example, if the second elevator group 52-2 is required to bring extraordinary many articles to the work station AP2, FTF 28 belonging to the first fleet which in turn is assigned to the first elevator group 52-1 can be assigned temporarily to the second elevator group 52-2. Alternatively, one of the vertical conveyors 20-1 to 20-4 of the first elevator group 52-1 can be assigned for a certain time to the second elevator group 52-2. In this way, for example, the vertical conveyor 20-3 can be assigned together with its FTF 28 to the second elevator group 52-2 for a certain time.

It is clear that the vertical conveyors 20 of an elevator group 52 can also be arranged remotely to each other. It is not required that all of the vertical conveyors 20 of an elevator group 52 are arranged directly adjacent to each other. The FTF 28 allow material-flow connection of even far away arranged vertical conveyors 20 to a corresponding work station AP. By the way, this also applies for the remotely arranged rack arrangements 14 (decentralized warehouse structure) which are connected to each other via the conveying plane 24 or the FTF 28. This free possibility of assignment of the FTF 28 to the vertical conveyors 20, or to the work stations AP, and the material streams resulting therefrom cannot be represented by a conventional pre-zone or a conveying system thereof. The conventional conveying system is a steady conveyor, course of lines and course of which are fixedly given and cannot be changed without efforts in short time, and particularly not temporarily.

Figure 7A:
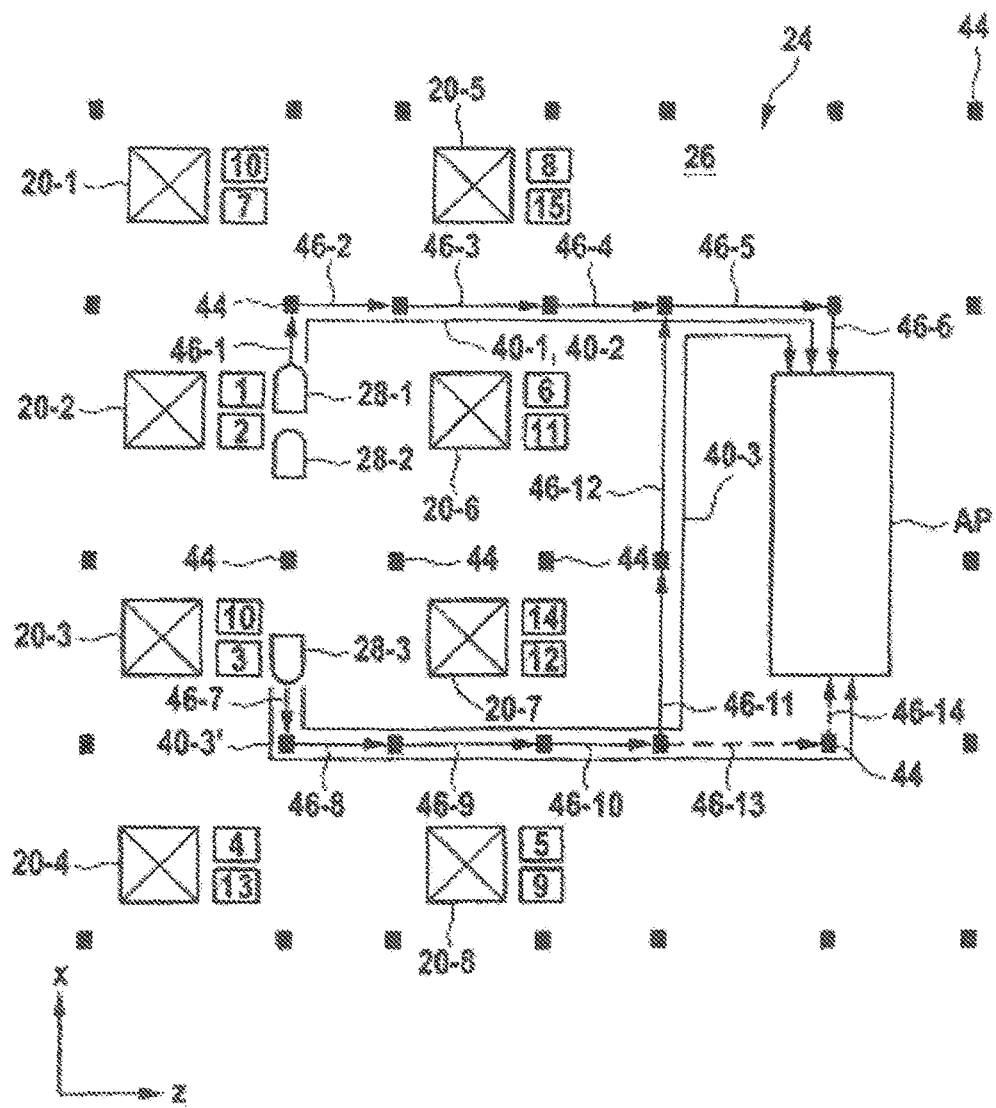
FIG. 7A shows a top view of a conveying plane for illustrating possible travelling paths.

FIG. 7A serves amongst other things for the illustration of a sequencing process. FIG. 7A shows a top view of a conveying plane 24 which exemplarily encloses (geometrically), amongst other things, eight vertical conveyors 20-1 to 20-8 as well as one work station AP. The racks 16, which are arranged on top of beneath, are not shown. Respectively at the right-hand side adjacent to the vertical conveyors 20 two rectangles including a number between 1 and 16 are shown. These rectangles represent sixteen articles which are required for processing an order at the work station AP in an ascending order from #1 to #16. These articles are deposited, for example, on transfer locations T (or handing-over locations in the conveying plane), which are not depicted here, of the vertical conveyors 20 and have been deposited by the SRD 22 "chaotically" on the transfer locations. "Chaotically" in this context means that the SRD 22 have retrieved the articles without considering any sequence, i.e. in a non-sequenced manner, from the racks 16 and have deposited the same—optionally in a pre-sequenced manner—on the transfer locations T. Preferably, at least the retrieval process is conducted in a path-optimized manner. This means that the SRD 22, if they are free, i.e. not loaded, take each of the articles of the order during passage of a corresponding rack location R and deliver same to the next free transfer location T. Thus, the articles are distributed chaotically over the vertical conveyors 20-1 to 20-8.

It is clear that the shown assignment (two articles for vertical conveyor 20) is merely selected for the purpose of a simplified explanation, in order to mask out a temporal component. Of course, each of the vertical conveyors 20 can transport—over time—more than two articles into the conveying plane 24 as soon as an assigned transfer location T, or handing-over location, is free again. FIG. 7A shows a snapshot where the SRD 22 have deposited each of the articles #1 to #16 on the transfer locations T or where the articles #1 to #16 have already been moved into the conveying plane 24 to handing-over locations. The handing-over locations are located in the conveying plane and represent the locations, or regions, where the vertical conveyors hand the articles over to the FTF 28. In this context devices can be used which are arranged separately to the vertical conveyors. However, even the vertical conveyors 20 can be used, for example, if the LHD thereof is located in the conveying plane 24 for the purpose of handing-over to the FTF 28.

At the work station AP of FIG. 7A the articles are required in an ascending order #1 to #16. For this purpose the fleet manager FM (not depicted) issues to a first FTF 28-1 a first FTF-travelling order for transporting the article #1 from the vertical conveyor 20-2 via a travelling path 40-1 to the work station AP including the segments 46-1 to 46-6 along the way points 44. A second FTF 28-2 gets an FTF-travelling order for the transport of the article #2 from the vertical conveyor 20-2 to the work station AP. The travelling path 40-2 of the second FTF 28-2 also includes the segments 46-1 to 46-6. The article #3 needs to be retrieved from the third vertical conveyor 20-3. The FM issues to a third FTF 28-3 a third FTF-travelling order defining an FTF-specific travelling path 40-3 which includes, for example, the segments 46-7 to 46-12 and 46-5 as well as 46-6. It is clear that the FTF-travelling orders are adjusted temporarily to each other such that the articles #1 to #3 arrive in the desired ascending order at the work station AP. In this context the selection of the travelling path 40, or the selection of the corresponding segments 46, can have an influence on the order, i.e. sequence.

In FIG. 7A an alternative travelling path 40-3' is shown for the third FTF 28-3 (cf. dashed lines). This alternative travelling path 40-3' includes the segments 46-7 to 46-10, 46-13 and 46-14. This alternative travelling path 40-3' is shorter than the other travelling path 40-3 of the third FTF 28-3. Assuming that each of the FTF 28 travels at the identical (constant) velocity, the third FTF 28-3 arrives earlier, upon selection of the alternative travelling path 40-3', at the work station AP than in accordance with the original travelling path 40-3 thereof.

In contrast to classic conveying systems (e.g. roller lines or belt conveyors) the travelling paths 40 can be combined arbitrarily by the segments 46. It is true that with classic conveying systems possibly also a number of possible routes exist from a first point to a second point within a warehouse. However, the number of these possible routes is limited and infinitesimal compared to the huge, almost infinite, number of courses of lines, or travelling paths 40, which can be construed and which can be combined from the "construction kit" of the segments 46. This diversity of possible travelling paths 40 represents one aspect which makes the final order generation possible in the conveying plane 24, in particular if a lot of FTF 28 are operated simultaneously. This will be explained in more detail below with reference to FIG. 7B.

Figure 7B:
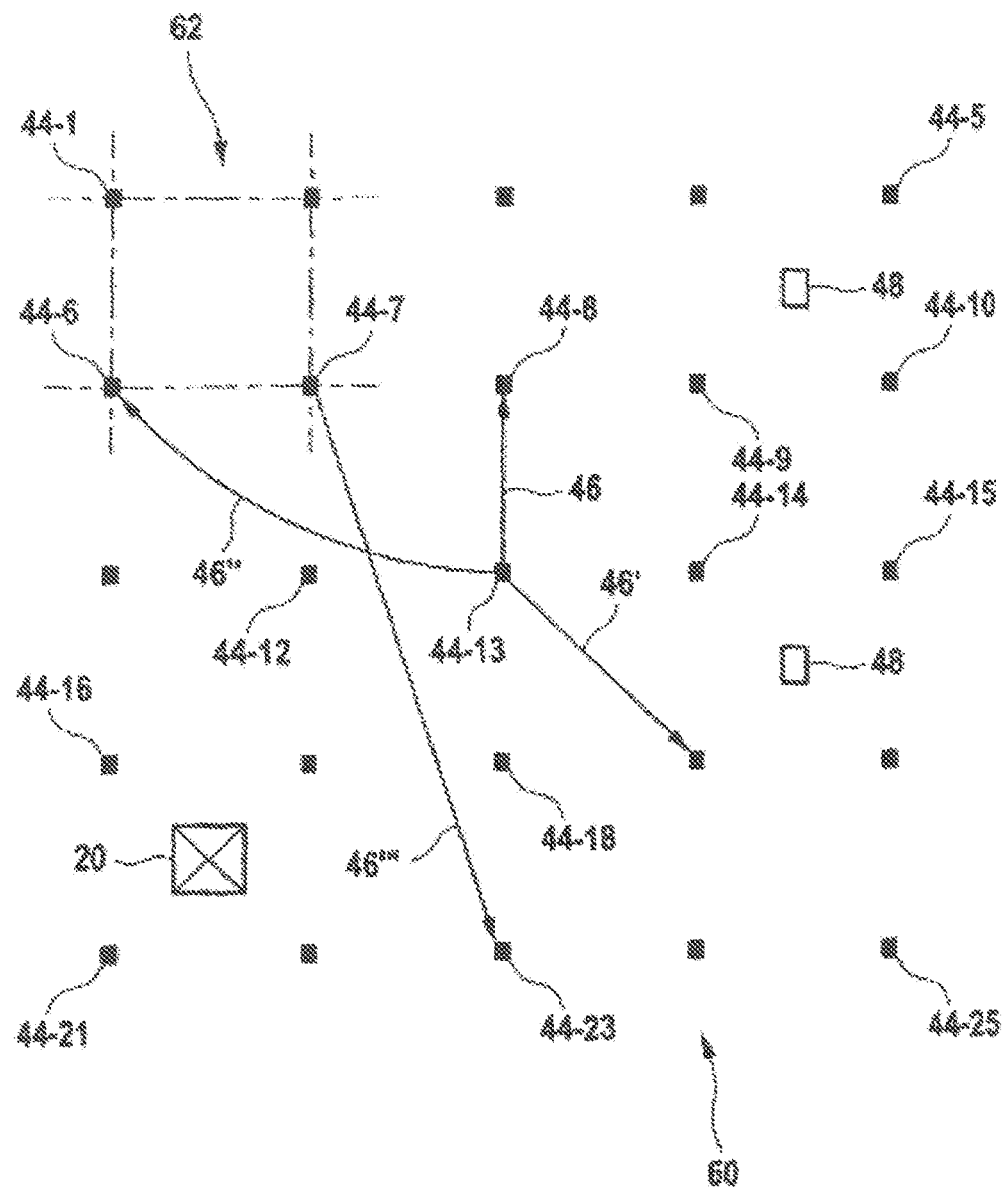
FIG. 7B shows a top view of a topology for illustrating possible segments.

FIG. 7B shows an exemplary topology 60 comprising a grid 62 of grid points or way points 44. The topology 60 further includes obstacles such as a vertical conveyor 20 and a rack post 48. It is clear that the topology 60 comprises the positions of these elements. The topology 60 can further comprise the dimensions of the travelling area 26.

The way points 44 of FIG. 7B represent points of intersection of an (imaginary) grid which is indicated by means of dashed lines in the upper left corner. 25 grid points 44-1 to 44-25 are exemplarily shown which are arranged along a regular grid. It is clear that the grid does not need to be structured regularly. The way points 44 can also be distributed chaotically over the area 26.

The way points 44 are connected to each other by segments 46. The segments 46 are defined such that the FTF 28 do not collide with obstacles (e.g. the rack posts 48) during travelling along the segments 46. Via the segments 46 one way point 44, e.g., the way point 44-13, is not only connected to its direct next neighbor (44-8, 44-12, 44-14, and 44-18) but via diagonal segments 46' also to way points 44 (44-7, 44-9, 44-17, and 44-19) which are located farther away. The segments 46" are curved and connect the way point 44-13, for example, to the way points 44-6, 44-2, 44-4, 44-10, 44-16, 44-22, 44-24, or 44-20. Other segments 46 can be defined arbitrarily such as the segment 46''' along a straight line from the way point 44-7 to the way point 44-23. The possibility of defining segments 46, and thus to construct travelling paths 40, are unlimited, in particular because the course of the connection, i.e. of the segment 46, between two way points 46 can be defined arbitrarily.

Returning to FIG. 7A the order can be influenced, besides the selection of the course of the travelling path 40 from a starting vertical conveyor 20 to the target work station AP (i.e. beside the selection of the segments 46), by a starting time at which the corresponding FTF 28 begins to travel or by a velocity at which the corresponding FTF 28 moves.

Additionally, the FTF 28 can travel through sequencing harps 50 (cf. FIG. 5) which, however, are not shown in FIG. 7A.

Buffering devices (not shown in FIG. 7A) can be provided additionally in the conveying plane 24.

In addition, it is clear that in the example of FIG. 7A more or less than three FTF 28-1 to 28-3 can be used for completing the picking order which includes the articles #1 to #16. The course of the travelling paths 40 of the FTF 28 can be selected freely due to the absence of barriers, if the vertical conveyors 20 and the rack posts 48 are not considered.

As another sequencing alternative the FTF 28 can perform overtaking maneuvers by letting the FTF 28 travel, for example, a loop instead of straight ahead. While the one FTF 28 travels a loop another one of the FTF 28 can overtake on the straight track. Of course, it is also possible to invert this process so that the FTF 28 overtakes on the loop while the other FTF 28 travels straight ahead. In this case it makes sense to adapt the travelling velocities additionally.

Hereinafter a communication, which is not illustrated in more detail in the figures, between the material-flow computer MFR and the fleet manager FM will be described in the context of a loading process at a loading station 130.

An arbitrary piece good 116, such as the one with #1001, is ready for loading. The piece good #1001 stands, for example, directly in front of the separating conveyor 102. Before handing-over process to one FTF 28 can be initiated a new FTF 28 needs to be requested in order to stop at a corresponding loading-way point 44, or to pass the same in a synchronized manner. For this purpose the material-flow computer MFR transmits a travelling order to the fleet manager FM containing the information that the piece good #1001 is ready for retrieval, for example, at the way point #13. The fleet manager FM receives this travelling order and checks whether a corresponding order ID already exists in the system. If not, a new FTF 28 having the designation, for example, W42 is selected for travelling to the way point #13. The travelling order is stored, the travelling-order ID and an appropriate route are transmitted to the selected FTF 28.

The selected FTF 28 travels to the desired way point no. 13 and transmits a corresponding signal to the fleet manager FM. The fleet manager FM finds the order for this order ID and can now complete the order.

The material-flow computer MFR then starts the transfer of the piece good no. #1001. This means that the loading of the FTF 28, which is designated by W42, can be initiated. For this purpose a signal is output to a further controlling device which is responsible for the conveying system in order the piece good #1001 from the conveying system onto the separating conveyor 102 and from the separating conveyor 102 onto the FTF 28. Subsequently, the FTF 28 is driven to a desired target location for receiving the piece good #1001.

In a similar manner an unloading process is performed.

Figure 8:
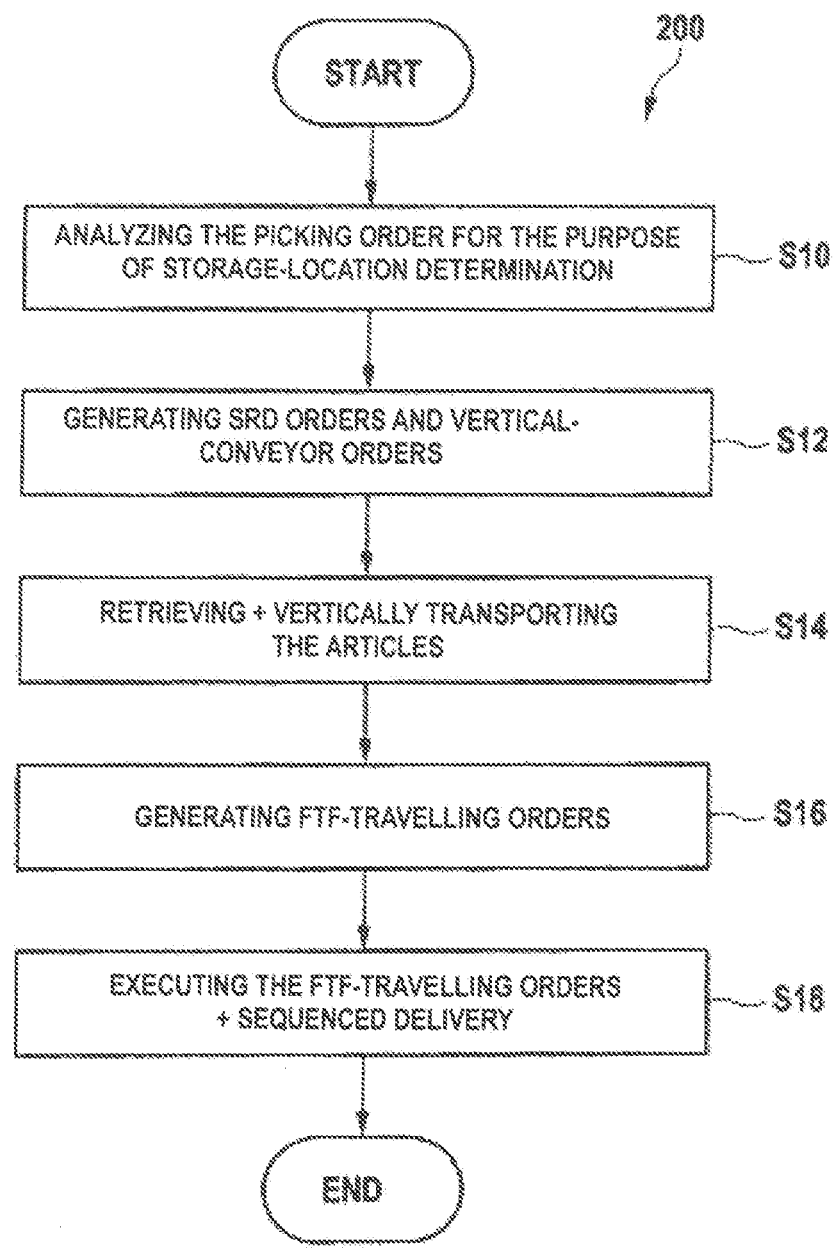
FIG. 8 shows a flow chart.

FIG. 8 shows a flow chart which explains, in a general manner, the above-described method for retrieving chaotically and providing the articles in a sequenced manner at the work station AP.

In a first step S10 the picking orders, or the picking order, is analyzed for determining the rack locations R in which rack locations the required articles are stored. In step S12 SRD-orders and vertical-conveyor orders are generated and transmitted to the SRD 22 and the vertical conveyors 20. In step S14 the required articles are retrieved by the SRD 22 and transported vertically into the conveying plane 24 by the vertical conveyors 20. In step S16 FTF-specific travelling orders, or FTF-travelling orders, are generated and transmitted to the affected, or selected, FTF 28. In step S18 the FTF-travelling orders are executed by the FTF 28 for delivering the articles in the desired absolute order to the work stations AP.

Up to now it has been described substantially a retrieval including a final sequenced handing-over to a target location such as one of the work stations AP for the purpose of picking. In this context the material flow 12 is performed from the rack arrangement 12 via the vertical conveyors 20, which represent in relation to the FTF-travelling orders or to the FTF-travelling paths start locations in the conveying plane 24, to the work stations AP which represent in relation to the FTF-travelling orders, or FTF-travelling paths 40, the target locations.

It is clear that the invention can also have advantages during storage, i.e. stocking. The material flow 12 is directed oppositely during storage, i.e. the vertical conveyors 20, which then are storing, are then target locations for the FTF 28, which arrive from the WE (cf. FIG. 1), and separation stations (not depicted in FIG. 1), where, for example, goods-receipt pallets carrying articles of one type only are separated individually onto the FTF 28, are then start locations for the FTF 28 in the conveying plane 24. In this case, the conveying plane 24 represents, in terms of material-flow planning, a stage in the process of article distribution. With the article distribution the WE-articles are distributed, in terms of material flow, over the rack arrangement 14 (SKU spread) so that later during retrieval each article of an arbitrary picking order can be retrieved from the rack locations R of a, preferably single, rack aisle 18. Also storage-filling grade, which in the ideal case should be identical in each region of the rack arrangement 14, can be considered when the processes for storing goods are planned.

In this case the conveying plane 24 plays a decisive role because contrary to the classic pre-zone having steady conveyors each rack location R can be reached via a shortest way, or path. The FTF 28 can move freely below, above, or inside the rack arrangement 14 along goods-receipt-article-specific, preferably path-optimized, travelling paths 40 which can be selected freely. The FTF 28 travel to such vertical conveyors 20 which are located as close as possible to a desired storage-rack location R. With multiple-deep handling even the sequence plays again a role so that the conveying plane 24 also operates in a sequenced manner during the process of storing.

Figure 9A:
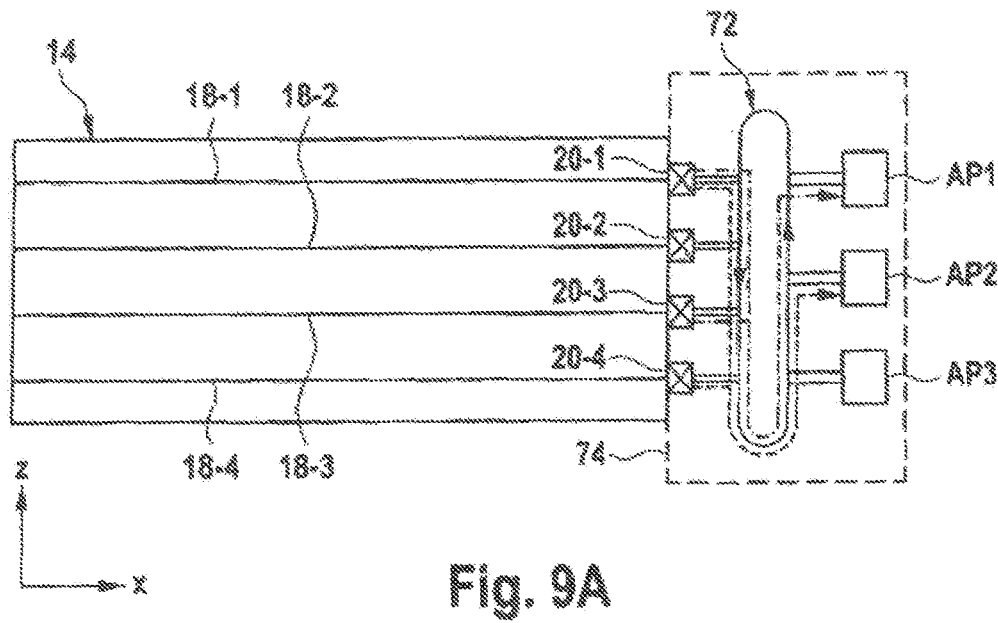
FIG. 9A shows a prior artarrangement.
Figure 9B:
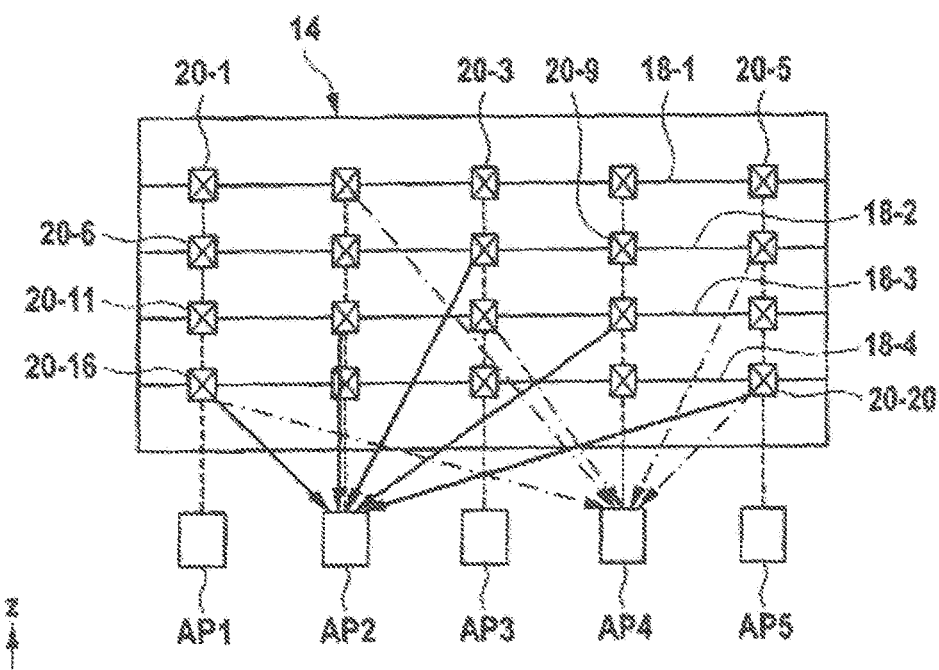
FIG. 9B shows in relation to FIG. 9A a comparison between the invention and the prior art.

The FIGS. 9A and 9B serve for illustrating the differences with regard to material flow 12, or throughput, which is possible with a conventional storage and order-picking system (FIG. 9A) having a classic pre-zone (elevators and sorting circle at the front face) and with the storage and order-picking system (FIG. 9B) in accordance with the invention. In accordance with the invention each of the vertical conveyors 20 can be assigned to each arbitrary work station AP (start/target location), wherein a plurality of different short travelling paths 40 between the respective vertical conveyors 20 and the assigned work station AP exists, resulting in the huge sequencing and distributing potential of the conveying plane 24.

The FIGS. 9A and 9B show two rack arrangements 14 which respectively have the same size, i.e. comprise an identical number of rack locations R and an identical number of rack aisles 18. Also the dimensions of the rack arrangement 14 are identical. However, the FIGS. 9A and 9B distinguish in the number and positions of the vertical conveyors 20 and in the possible different travelling paths 40 from one of the vertical conveyors 20 to one of the work stations AP and back.

In FIG. 9A there are provided four vertical conveyors 20-1 to 20-4, which are arranged at a front face of the respective rack aisles 18-1 to 18-4 and which are connected to a sorting circle 72 via conveying-line branches 70. The conveying-line branches 70 and the sorting circle 72 are formed as steady conveyors and are arranged in the classic pre-zone 74, where three work stations AP1 to AP3 are arranged as well. Each of the vertical conveyors 20-1 to 20-4 can supply each arbitrary one of the work stations AP1 to AP3. In the example of FIG. 9A the first vertical conveyor 20-1 supplies both the work station AP1 (cf. dot-dashed line) and the work station AP 2 (cf. dashed line). The first work station AP1 is further supplied by the third vertical conveyor 20-3. The second work station AP2 is further supplies by the fourth vertical conveyor 20-4. Both the front-faced vertical conveyors 20-1 to 20-4 and the sorting circle 72, which is typically operated in a unidirectionally circulating manner, represent "bottlenecks" in terms of material flow. Indeed, each of the work stations AP1 to AP3 can be supplied by several ones of the vertical conveyors 20-1 to 20-4. However, each of the storage goods needs to be transported via the (identical) sorting circle 72. The sorting circle 72 has a limited capacity with regard to both its receiving capability and its sequencing capability. These drawbacks are boosted if several ones of the work stations AP1 to AP3 are supplied by respectively several ones of the vertical conveyors 20-1 to 20-4. Actually, there is only one short path from each of the vertical conveyors 20-1 to 20-4 to a specific work station AP. This "short" path always leads through the sorting circle 72. Many and greater portions of the sorting circle 72 are used in common by several ones of the vertical conveyors 20-1 to 20-4 for supplying the work stations AP1 to AP3. Thus "traffic density" within the sorting circle 72 increases and rapidly reaches its natural limit.

This is different with the invention. As depicted in FIG. 9B, again each of the vertical conveyors 20-1 to 20-20 can supply each of the work stations AP1 to AP5. In FIG. 9B the second work station AP2 is exemplarily supplied by the vertical conveyors 20-16, 20-12, 20-8, 20-13, and 20-20. The fourth work station AP4 is exemplarily supplied by the vertical conveyors 20-16, 20-2, 20-13, 20-10, and 20-20. The supply of, or the assignment to, the second work station AP2 is indicated by means of bold-printed arrows. The supply of, or the assignment to, the fourth work station AP4 is indicated by means of dot-dashed arrows. These arrows represent many different short (travelling) paths which are different and which comprise, if at all, only a few portions in common. The reason for this is to be seen in the topology 60 which has already been described with reference to the FIGS. 7A and 7B and which will be described in more detail with reference to FIG. 7C.

For example, if the first vertical conveyor 20-1 of FIG. 9B supplies the fifth work station AP5, then there are many different short paths which, in particular, do not overlap at all. A first possible path extends at first in Z and then in X. A second possible path extends at first in X and then in Z. A third possible path extends "step-like" from the left upper corner of FIG. 9B towards the right lower corner of FIG. 9B.

In FIG. 9B no sorting circle is required at all. No sorting circles are provided at all. A plurality of short paths between start locations and target locations exist instead.

The great number of possible paths results from the topology 60 which allows arbitrary definition of the segment 46. In this context it is referred to FIG. 7C. The great number of possible paths in turn allows that arbitrary many FTF 28 are started at the same time, stop, and can move freely in space, or within the area 26. The transport is conducted in parallel.

FIG. 7C shows a plurality of way points 44 which are arranged along a grid 62 (regular point arrangement). A centrally arranged way point 44' comprises adjacent way points 44 of different grades. The adjacent way points 44 hereinafter are also called neighbors. The way points, which are adjacent in the orthogonal directions X and Z represent neighbors of first grade (NB1). The way points 44, which are directly adjacent in diagonal direction, represent neighbors of second grade (NB2). These neighborhood relations can be continued arbitrarily. In FIG. 7C neighbors of third grade (NB3) and neighbors of fourth grade (NB4) are shown additionally.

From the central way point 44' arbitrary segments 46, preferably in terms of curved lines, can be defined. Thus the segments 46 to the neighbors of the second grade (NB2) represent, for example, quarter circles. The adjacent way point 44 of the second grade can be reached faster via the quarter circle than via the combination of two orthogonal segments to the neighbors of the first grade (NB1).

The material-flow computer MFR (cf. FIG. 1) is configured to define travelling paths 40, or segments 46, between arbitrary way points 44, wherein, in particular direct, short connections (segments 46) can be defined as shown in FIG. 7C.

The FTF 28 can follow such segments 46 easily if the segments 46 are virtual lines. Of course, the segments 46 can also be stuck on the facility floor, wherein re-configuration is less expensive compared to virtual segments 46. However, in comparison to a permanently provided conveying system, where the course of lines actually cannot be changed at all after installation and which is orientated perpendicularly in most cases, the topology 60 is characterized by high flexibility with regard to possible courses of lines. Thus it is possible, amongst other things, to define a plurality of the above-mentioned short paths on which the storage goods can be transported from a start location to a target location, wherein the paths substantially do not overlap. In this manner the above-described bottleneck is avoided. With the invention the segments 46 can be used arbitrarily and individually in a bidirectional manner, whereas with conventional conveying systems entire lines, or portions, would need to be reversed.

In FIG. 9A the throughput performance is finite because only a few vertical conveyors 20 are provided and the sorting circle 72 has a finite capacity. In FIG. 9B a substantially higher throughput performance can be reached by the higher number of vertical conveyors 20 and possible travelling paths 40. During planning of the layout already a maximum stage of expansion (number of the vertical conveyors 20, start/target locations, FTF 28, etc.) already can be configured. In this way the system of FIG. 9B can be adapted in a stepwise manner, scalable and temporarily changeable to requirements of the market (e.g., e-commerce) at any time.

Figure 10:
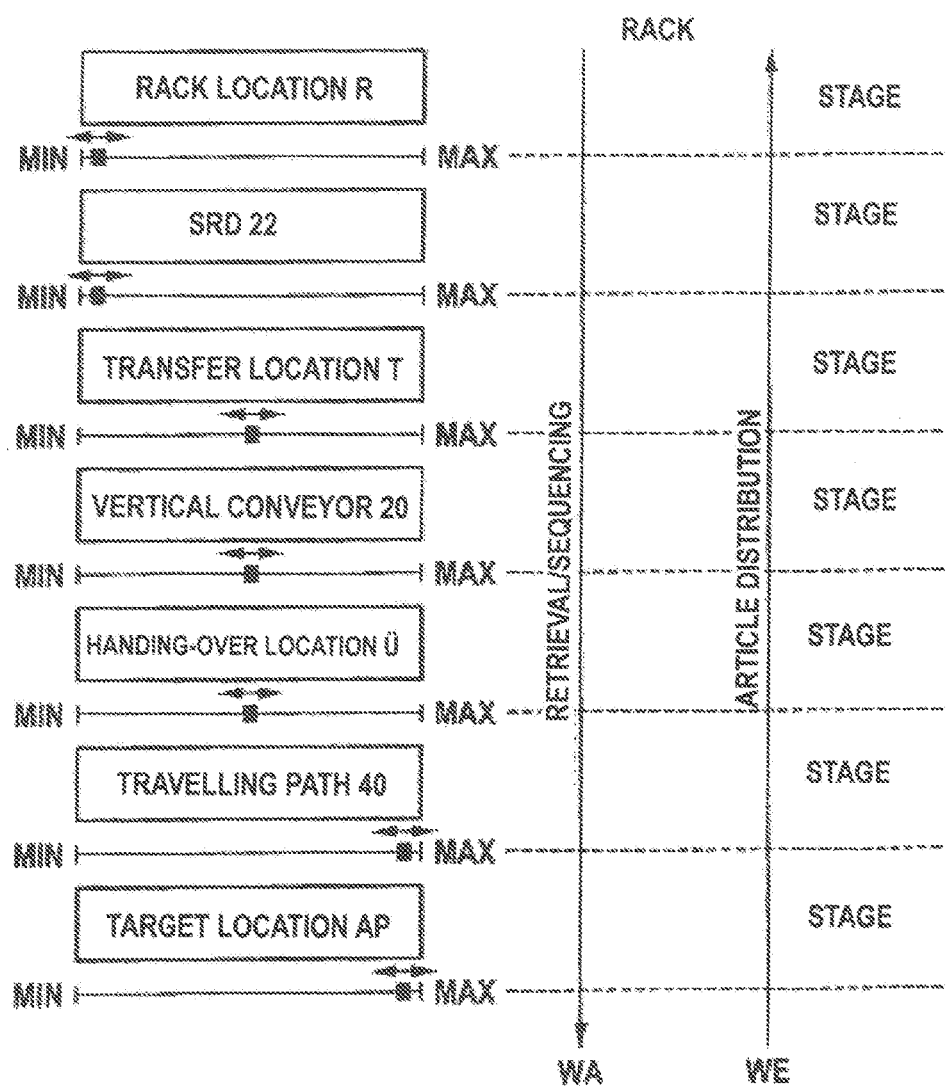
FIG. 10 shows a block diagram for depicting a controlling mechanism being related to sequencing stages (retrieval) and (article) distributing stages (storage).

FIG. 10 serves for illustrating a dynamic sequence shifting, or a dynamic (article) distribution shifting.

The material flow 12 represents a control system. During picking it is retrieved. In this context the material flow 12 is directed from the rack locations R towards the goods issue WA. During storage the material flow 12 is directed from the goods receipt WE towards the rack locations R. During picking, or retrieval, a sequence has to be considered since the to-be-retrieved articles are supposed to arrive in the desired absolute order at the target location (work station AP). During storage of goods-receipt articles into the rack 16 one has to consider that the articles are distributed as even as possible (SKU spread).

Independent of the direction in which the material flow 12 is directed, the following elements are involved: rack locations R, SRD 22, transfer locations T, vertical conveyors 20, handing-over locations U, travelling paths 40, and start/target locations. Each of these elements can have assigned its dedicated control stage being set by the material-flow computer MFR. This is indicated in FIG. 10 by horizontal controllers which are depicted directly beneath the elements and which can be set between the two extreme positions MIN and MAX. It is clear that the change of one of the controllers has effects on the setting of the other controllers.

In FIG. 10 exemplary controller settings for a retrieval process are shown. The material-flow computer MFR receives one or more orders, which are analyzed with regard to the articles and which are required for processing the orders. After the analysis it is clear where the potential article candidates for the order are located within the rack arrangement 14. A first control stage, which is assigned to the rack locations R, is set in FIG. 10 such that the MFR can freely select from which of the possible rack locations R a required article is to be retrieved. Similar applies for the control stage being assigned to the SRD 22. With regard to sequence, the requirements to the SRD 22 are set to a minimum so that the SRD 22 are allowed to chaotically retrieve and deliver the to-be-retrieved articles, which in turn results in optimized (short) paths. The control stages being assigned to the transfer locations T, the vertical conveyors 20, and the handing-over locations U are set to a center value. The control stage being assigned to the travelling paths 40 (necessarily) needs to perform a lot of sequencing work because the retrieved articles arrive chaotically in the conveying plane 24. Thus, the FTF 28 are mainly responsible for the fact that the retrieved articles arrive in the right order at the target locations (work stations AP). The control stage being assigned to the target locations is also shown at its maximum setting because the to-be-retrieved articles shall arrive exactly in the right order at the work station AP.

It is clear that such controller settings can also be adapted to each other in the opposite direction, i.e. when articles from the goods receipt are to be distributed to the rack locations R. The huge plurality of possible travelling paths in the conveying plane 24 allows high flexibility when the travelling paths are planned. Bottlenecks with regard to the material flow 12 do not exist in the conveying plane 24.

The material-flow computer MFR is configured to set the controller stages, which influence each other and which are dependent from each other, in an optimized manner so that the performance of the overall system is at a maximum. Thus, the system behaves comparable to an equalizer. Each of the material flow components represents a dedicated controller. If the controllers are adjusted optimally to each other a "clear" good sound can be achieved.

The adjustability of the individual control stages allows the selection of an initially ideal magnitude (warehouse layout).

LIST OF REFERENCE NUMERALS 10 storage and order-picking system
WE goods receipt
WA goods issue
12 material flow
14 rack arrangement
16 rack
18 (rack) aisle
20 vertical conveyor
T transfer locations
R rack locations
22 storage and retrieval device/SRD
AP work station
24 conveying plane
26 travelling/action area
28 driverless transport vehicle
MFR material-flow computer
LVR warehouse-management computer
FM fleet manager
30 (basic) vehicle
32 article receiving device
34 top
36 (proprietary) communication protocol
40 travelling path
42 elevator arrangement
44 way point
46 segment
48 rack posts
50 sequencing harp
52 elevator group
60 topology
62 grid
70 conveying-system branches
72 sorting circle
74 pre-zone

The invention claimed is:

1. A storage and order-picking system for storing and retrieving a plurality of storage goods, wherein the storage goods arrive in a desired order at a target location during sequenced retrieval or wherein the storage goods are distributed during storage, comprising:
a statically arranged rack arrangement including a plurality of racks, wherein the racks respectively comprise a plurality of rack locations being arranged on top of each other and next to each other, in which rack locations the storing goods are storable and retrievable, wherein the racks define at least one rack aisle between each other,
a plurality of statically arranged vertical conveyors, wherein respectively several ones of the vertical conveyors are arranged either laterally adjacent to longitudinal sides of the corresponding racks or within the corresponding racks for the purpose of linking the rack aisles, and wherein the vertical conveyors transport the storage goods substantially vertically;
a plurality of transfer locations which are arranged for decoupling material-flow between the vertical conveyors and the storage and retrieval devices in the rack arrangement, wherein each of the vertical conveyors has assigned at least one of the transfer locations;
a plurality of storage and retrieval devices which travel in the rack aisles, wherein the storage and retrieval devices store and retrieve the storage goods and transport the storage goods substantially horizontally along the rack aisles;
a conveying plane which:
is substantially free of barriers;
extends horizontally beneath, above, or through the rack arrangement;
includes handing-over locations;
is coupled, in terms of conveyance, via the vertical conveyors, which reach vertically from the rack arrangement into the conveying plane, to the rack arrangement, wherein each of the vertical conveyors has assigned at least one of the handing-over location;
includes a plurality of start/target locations, wherein each of the vertical conveyors is coupable respectively via several different short travelling paths to each of the start/target locations; and
includes a base area which base area includes a topology of a plurality of way points and segments;
and a material-flow computer having access on the topology and being configured for generating and outputting storage-good-specific transport orders, which are sequence-weighted or distribution-weighted, in order to transport the storage goods between the rack locations and the start/target locations, wherein the transport orders respectively comprise a travelling path, which represents associated segments, in the conveying plane along which travelling path the storage goods are moved in a dedicated manner between the handing-over locations and the start/target locations by means of autonomous driverless transport vehicles FTF, wherein each of the segments connects one of the way points to another one of the way points.

2. The system of claim 1, wherein the way points are arranged along a regular grid.

3. The system of claim 1, wherein the material-flow computer is further configured to define each of the segments free of barriers from one of the way points to another way point which is a neighbor of at least second grade.

4. The system of claim 1, wherein the plurality of rack locations represents a first control stage, wherein the plurality of the storage and retrieval devices represents a second control stage, wherein the plurality of the vertical conveyors represents a third control stage, wherein the plurality of possible travelling paths represents a fourth control stage, and wherein the plurality of start/target locations represents a fifth control stage.

5. The system of claim 4, wherein the plurality of transfer locations represents a further control stage.

6. The system of claim 5, wherein the handing-over locations represent a still further control stage.

7. The system of claim 4, wherein each of the control stages represents, for the planning of a retrieval process, a dedicated sequencing stage and wherein each of the control stages represents a dedicated distribution stage for the planning of a storing process.

8. The system of claim 7, wherein the material-flow computer is configured to adjust the control stages to each other by weighting such that one of retrieval performance and storage-good distribution is optimal.

9. The system of claim 1, wherein the material-flow computer is further configured to plan the transport orders in a path-optimized manner at least for the storage and retrieval devices.

10. The system of claim 1, wherein each of the transport orders is defined by at least one of the following storage-good-specific parameters:
   selection of one of the rack locations;
   selection of one of the storage and retrieval devices which stores or retrieves the storage goods into a selected storage location;
   selection of one of the vertical conveyors;
   selection of a start/target location; and
   selection of one of the travelling paths which connects a selected vertical conveyor via the associated segments to a selected start/target location.

11. The system of claim 1, wherein the base area encloses the racks and the rack aisles of the rack arrangement.

12. The system of claim 1, which further comprises a plurality of autonomous driverless transport vehicles FTF in the conveying plane which FTF travel in a guided manner along the segments.

13. The system of claim 1, wherein the conveying plane comprises a plurality of steady conveyor modules implementing the segments in terms of lines and implementing the way points in terms of crossings or branches.

14. The system of claim 1, wherein the topology further comprises position information of the vertical conveyors and other travelling obstacles in the base area.

* * * * *